(12) United States Patent  (10) Patent No.: US 6,513,412 B2
Young  (45) Date of Patent: Feb. 4, 2003

(54) ADJUSTMENT MECHANISM

(75) Inventor: Ronald E. Young, Cheswick, PA (US)

(73) Assignee: Porter Cable Corp., Jackson, TN (US)

( * ) Notice: Subject to any disclaimer, the term of this patent is extended or adjusted under 35 U.S.C. 154(b) by 0 days.

(21) Appl. No.: 09/777,403

(22) Filed: Feb. 6, 2001

(65) Prior Publication Data

US 2002/0088327 A1 Jul. 11, 2002

Related U.S. Application Data

(60) Provisional application No. 60/260,452, filed on Jan. 9, 2001.

(51) Int. Cl.[7] ............................................. B27B 5/18
(52) U.S. Cl. .......................... 83/471.3; 83/581; 83/490
(58) Field of Search ............................ 83/471.3, 581, 83/468.7, 477.1, 477, 698.51, 698.41, 490

(56) References Cited

U.S. PATENT DOCUMENTS

| | | | |
|---|---|---|---|
| 2,962,286 A | * 11/1960 | Brouwer | 273/79 |
| 3,998,121 A | * 12/1976 | Bennett | 83/471.3 |
| 4,011,782 A | * 3/1977 | Clark et al. | 83/471.3 |
| 4,527,453 A | 7/1985 | van Hauten | |
| 4,537,105 A | 8/1985 | Bergler | |
| 4,559,857 A | 12/1985 | Grossmann et al. | |
| 4,934,233 A | 6/1990 | Brundage et al. | |
| 5,020,406 A | 6/1991 | Sasaki et al. | |
| 5,042,348 A | 8/1991 | Brundage et al. | |
| 5,046,390 A | 9/1991 | Sasaki | |
| 5,054,352 A | 10/1991 | Fushiya et al. | |
| 5,063,805 A | 11/1991 | Brundage | |
| 5,146,826 A | 9/1992 | Shiotani et al. | |
| 5,191,821 A | 3/1993 | Metzger, Jr. et al. | |
| 5,207,141 A | 5/1993 | Dehari | |
| 5,216,964 A | 6/1993 | Sato et al. | |
| 5,249,496 A | 10/1993 | Hirsch et al. | |
| 5,357,834 A | 10/1994 | Ito et al. | |
| 5,383,382 A | 1/1995 | Garuglieri et al. | |
| 5,524,516 A | 6/1996 | Sasaki et al. | |
| 5,564,323 A | 10/1996 | Sasaki et al. | |
| 5,590,991 A | 1/1997 | Garuglieri | |
| 5,595,124 A | * 1/1997 | Wixey et al. | 108/50 |
| 5,720,096 A | * 2/1998 | Dorsey | 29/559 |
| 6,016,732 A | * 1/2000 | Brault et al. | 83/471.3 |
| 6,101,678 A | * 8/2000 | Malloy et al. | 16/438 |

* cited by examiner

Primary Examiner—Kenneth E. Peterson
Assistant Examiner—Amar Flores-Sánchez
(74) Attorney, Agent, or Firm—Kirkpatrick & Lockhart LLP

(57) ABSTRACT

Apparatus for releasably adjusting a position of a first portion of a device relative to a second portion of the device. The first portion includes a first surface, and the second portion includes a second surface. A workpiece support surface is defined by the first and second surfaces, and the first surface is rotatable relative to the second surface. A locking mechanism is provided to selectively restrain rotation of the first surface relative to the second surface. An indexing mechanism optionally is provided including a detent mechanism which selectively restrains rotation of the first surface relative to the second surface in one of a plurality of predetermined positions.

10 Claims, 38 Drawing Sheets

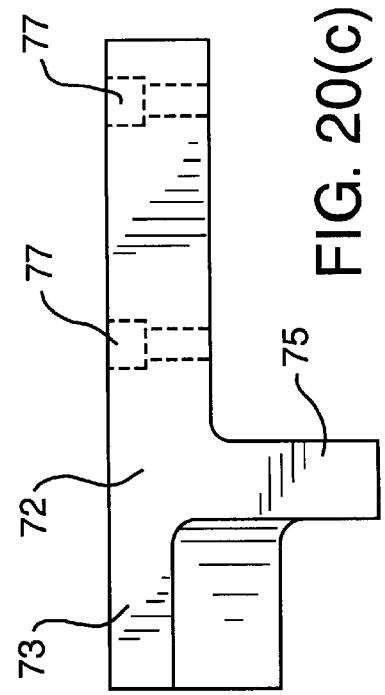
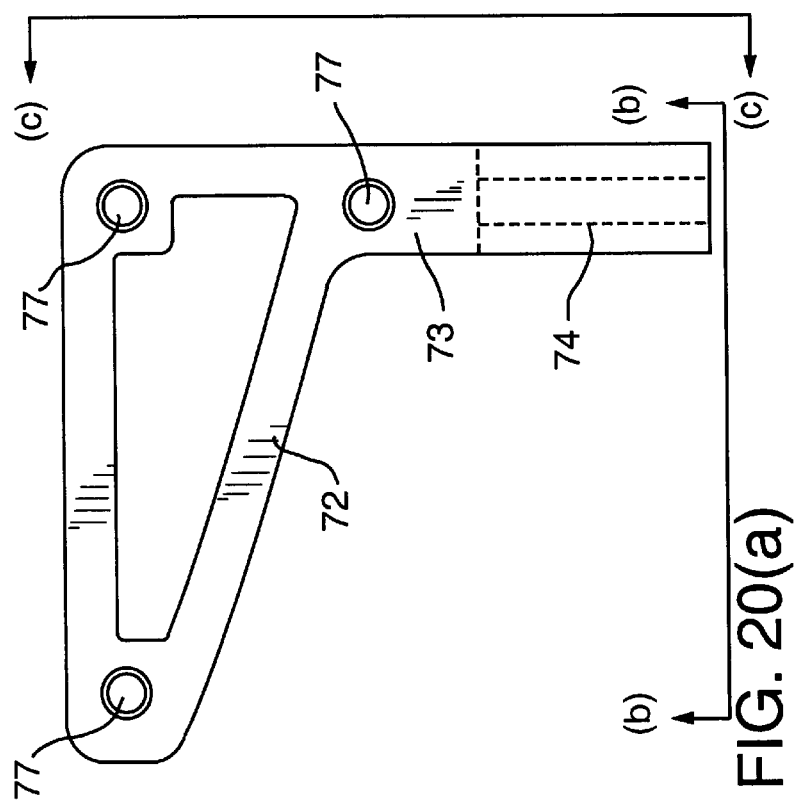
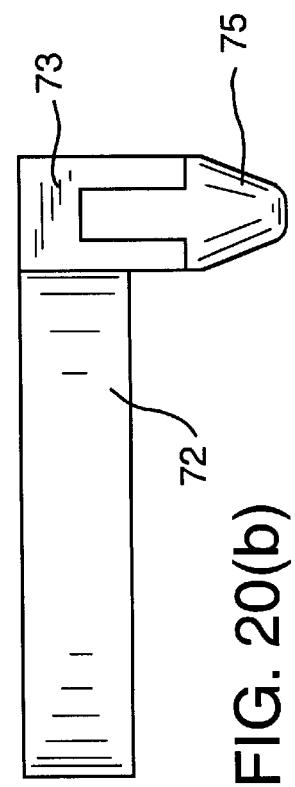

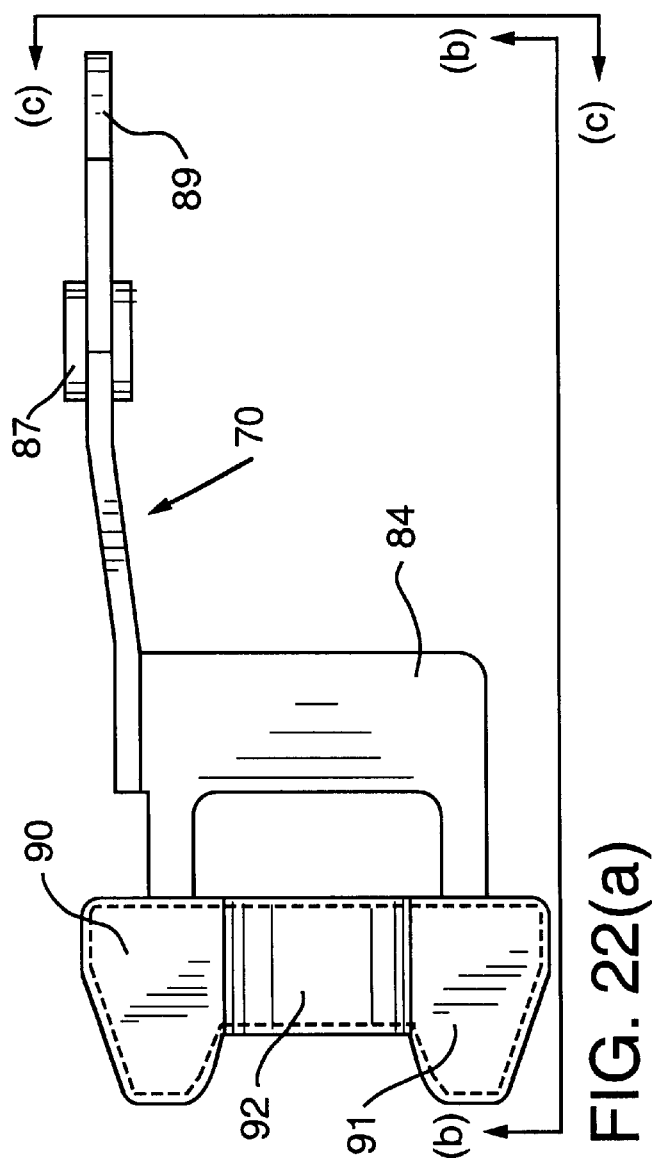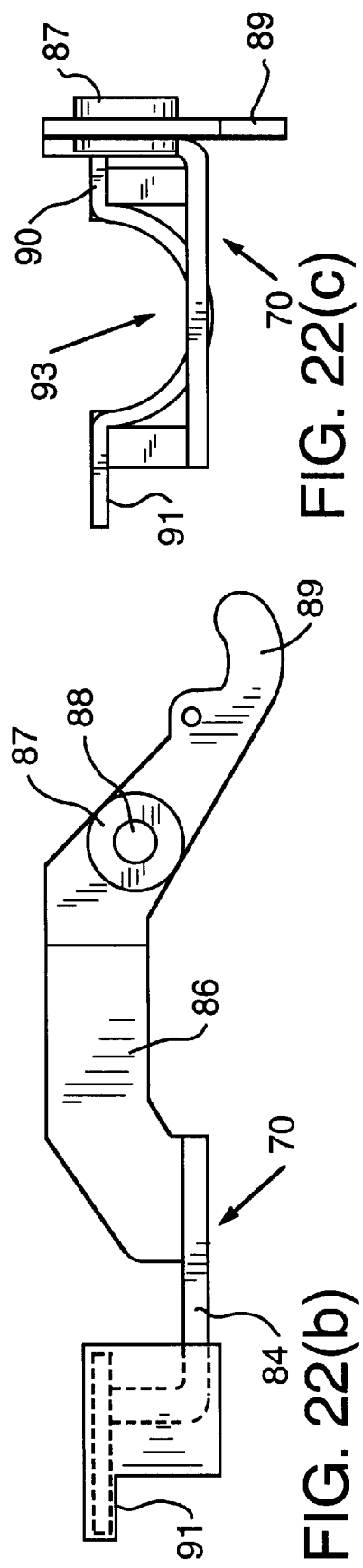
FIG. 22(a)
FIG. 22(b)
FIG. 22(c)

ADJUSTMENT MECHANISM

CROSS-REFERENCE TO RELATED APPLICATIONS

The present application claims priority under 35 U.S.C. §119(e) from U.S. provisional application Serial No. 60/260,452, filed Jan. 9, 2001.

FEDERALLY SPONSORED RESEARCH

Not applicable.

TECHNICAL FIELD AND INDUSTRIAL APPLICABILITY OF THE INVENTION

The present invention relates to adjustment mechanisms and, more particularly, to mechanisms for adjustment and locking of the workpiece support surface of devices, such as, for example, woodworking and metal working devices. The present invention may be adapted for use with any device having one or more support surfaces that may be adjusted in orientation relative to one or more other elements of the device. Examples of possible applications of the adjustment mechanism of the present invention include use of the invention as a mean for adjusting and locking the orientation of the rotatable workpiece support surface of a power operated miter saw.

DESCRIPTION OF THE INVENTION BACKGROUND

A number of known cutting devices include a driven cutting member such as, for example, a circular saw blade, and a generally planar workpiece support surface. In such devices, the workpiece support surface often includes two or more portions, and wherein the cutting member is rotatably mounted on one of the portions and the portions are adapted for adjustment relative to each other. For example, the workpiece support surface of cutting a device may include a base portion and a table portion, wherein the cutting blade is coupled to the table portion and the table portion is adapted for movement relative to the base portion. In such a device the base portion generally includes some type of workpiece guide, such as a fence, fixed thereto. The workpiece guide is generally adapted to support a workpiece in place relative to the base portion while the cutting member acts to cut the workpiece. Movement of the table portion relative to the base portion thus results in movement of the cutting member relative to the workpiece guide. Accordingly, in such devices, the cutting member may be oriented in various positions relative to a workpiece supported against the workpiece guide.

A specific example of a cutting device having the foregoing arrangement of elements is a power operated miter saw. Miter saws commonly include a table portion that is rotatable relative to the base portion to thereby allow the saw blade to change orientation relative to the workpiece guide of the miter saw. Adjustment of the orientation of the table portion relative to the base portion allows the saw blade to execute cuts at various miter angles through a workpiece supported by the workpiece guide.

In the example of a miter saw, it is important that the operator be able to easily and accurately position the cutting member relative to a workpiece supported against the workpiece guide and releasably lock the cutting member in the desired position. In particular, it is desirable that the position of the table portion and the attached cutting member be precisely adjustable to desired miter angles relative to the base portion and its attached workpiece guide. An adjustment mechanism is typically provided for adjusting the angle of the table portion relative to the base portion and for releasably locking the table portion in place relative to the base portion. In that regard, a variety of adjustment mechanisms are known to provide adjustment and releasable locking. However, most of these adjustment mechanisms are deficient in some respect. For example, certain of the known adjustment mechanisms that incorporate a detent or indexing mechanism to fix the position of the table portion relative to the base portion generally provide only for coarse adjustment of the table portion relative to the base portion. Other known adjustment mechanisms rely on frictional contact to fix the table portion relative to the base portion. Such mechanisms generally require significant effort on the part of the operator to generate a frictional force that is sufficient to suitably fix the table portion relative to the base portion.

Accordingly, it will be appreciated that there is a need to improve the design of adjustment mechanisms for accurately positioning and releasably locking the table portion of a miter saw or other similarly constructed cutting or abrading device relative to the base portion of the device. In particular, it would be advantageous to provide an adjustment mechanism by which the orientation of the rotatable table portion of a miter saw or the like may be quickly and easily repositioned and locked relative to other elements of the device such a mechanism would allow for rapid and precise adjustment and locking of the angle of the cutting member relative to the device's workpiece guide. More broadly, it would be advantageous to provide an improved adjustment mechanism for adjusting and locking a position of a first surface of a woodworking, metal working, or other device relative to other elements of the device.

SUMMARY OF THE INVENTION

The present invention is drawn to an apparatus which may be used to releasably adjust the position of a first portion of a device relative to a second portion of the device. The first portion includes a first surface, and the second portion includes a second surface. A workpiece support surface is defined by the first and second surfaces, and the first surface is rotatable relative to the second surface. A locking mechanism is provided to selectively restrain rotation of the first surface relative to the second surface. An indexing mechanism also may be provided including a detent mechanism which selectively restrains rotation of the first surface relative to the second surface in one of a plurality of predetermined positions.

The present invention also is directed to an adjustment mechanism for pivotably adjusting a position of a first surface of a first portion of an apparatus relative to a second surface defined by a second portion of the apparatus. The first portion is rotatable relative to the second portion. The adjustment mechanism includes a locking mechanism selectively restraining rotation of the first portion relative to the second portion. The locking mechanism includes a locking frame that is pivotably mounted on the first portion and includes a locking surface that selectively frictionally engages an engagement surface on the second portion. The adjustment mechanism also includes an actuating mechanism that selectively pivots the locking surface into frictional engagement with the engagement surface.

The present invention is additionally directed to an adjustment mechanism for adjusting the position of a first surface of a first portion relative to a second surface of a second portion, and wherein the second portion also includes an indexing surface including at least one indexing slot. The first portion is rotatable relative to the second portion. The adjustment mechanism includes an indexing mechanism which, in turn, includes a detent mechanism selectively restraining movement of the first surface relative to the second surface in one of a number of predetermined positions. The detent mechanism includes a detent body pivotably mounted on the first portion and having a detent pin that may selectively engage at least one indexing slot. The detent mechanism further includes a detent actuating mechanism contacting the detent body and selectively moving the detent pin out of the indexing slot.

The present invention additionally also is directed to an adjustment mechanism for pivotably adjusting the workpiece support surface of a woodworking machine. The workpiece support surface includes a first surface and a second surface, the first surface being defined by a table portion that is rotatable relative to a base portion defining the second surface. The adjustment mechanism includes a locking mechanism having a locking bar comprising a locking surface. The locking mechanism selectively restrains rotation of the table portion relative to the base portion. The indexing mechanism includes a detent mechanism, and the indexing mechanism selectively restrains rotation of the table portion relative to the base portion in one of a number of predetermined positions.

The present invention addresses shortcomings of the known adjustment mechanisms by providing a quick and easily manipulable arrangement for adjusting the position of a surface such as, for example, a workpiece support surface of a woodworking or other machine or device, relative to another surface or element. These and other details, features and advantages will be apparent to those of ordinary skill as the following detailed description of embodiments of the invention proceeds.

BRIEF DESCRIPTION OF THE DRAWINGS

In the accompanying Figures, there are shown embodiments of the invention wherein like reference numerals are employed to designate like parts and wherein:

FIGS. 20(a)–(c) are depictions of various views of the detent housing of the indexing mechanism of the embodiment of the adjustment mechanism shown in FIG. 19;

FIGS. 22(a)–(c) are depictions of the detent lever of the indexing mechanism of the embodiment of the adjustment mechanism shown in FIG. 19;

DESCRIPTION OF EMBODIMENTS OF THE INVENTION

Figure 1:
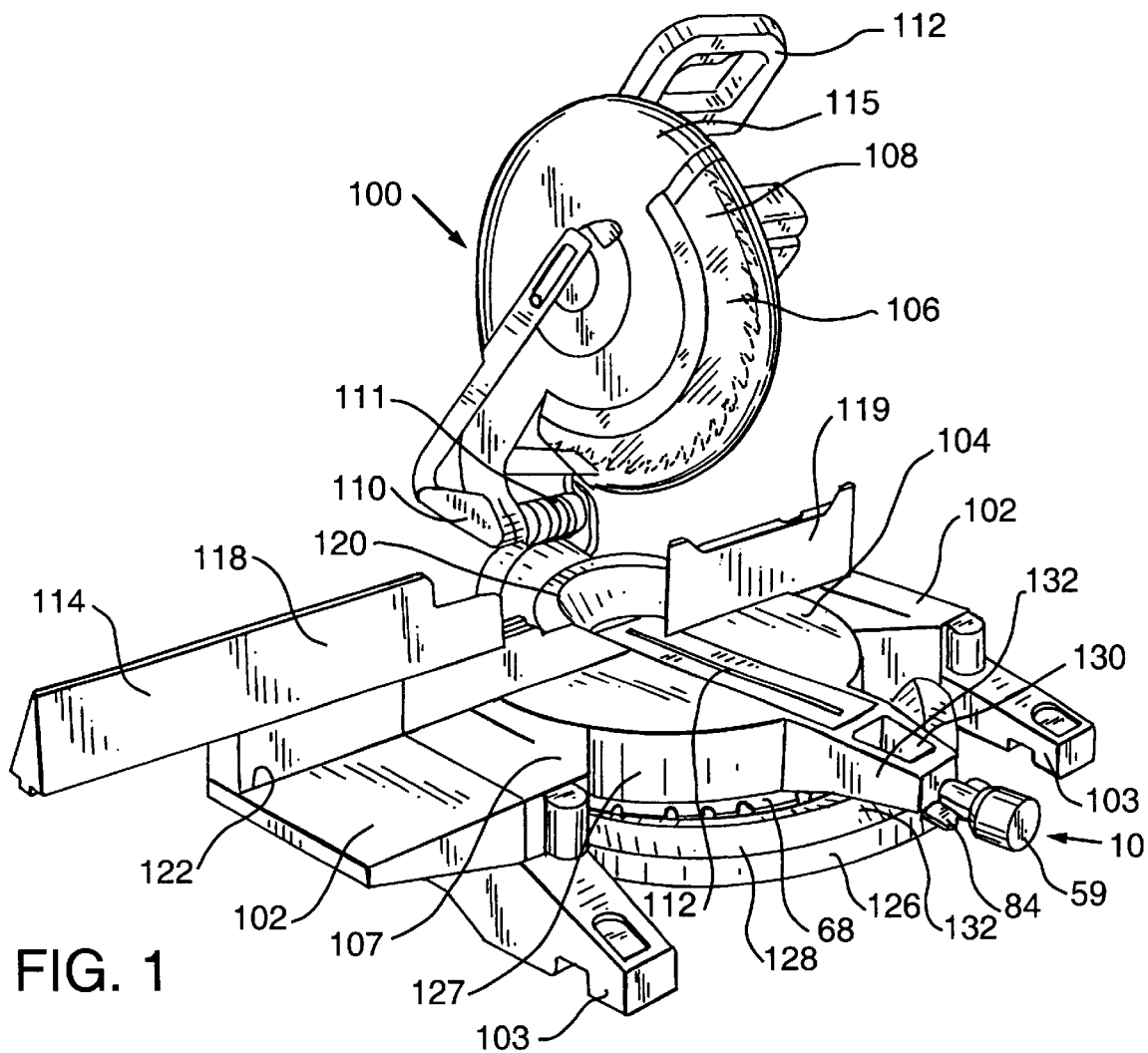
FIG. 1 is a perspective view of a miter saw showing certain elements of an embodiment of the adjustment mechanism of the present invention.
Figure 2:
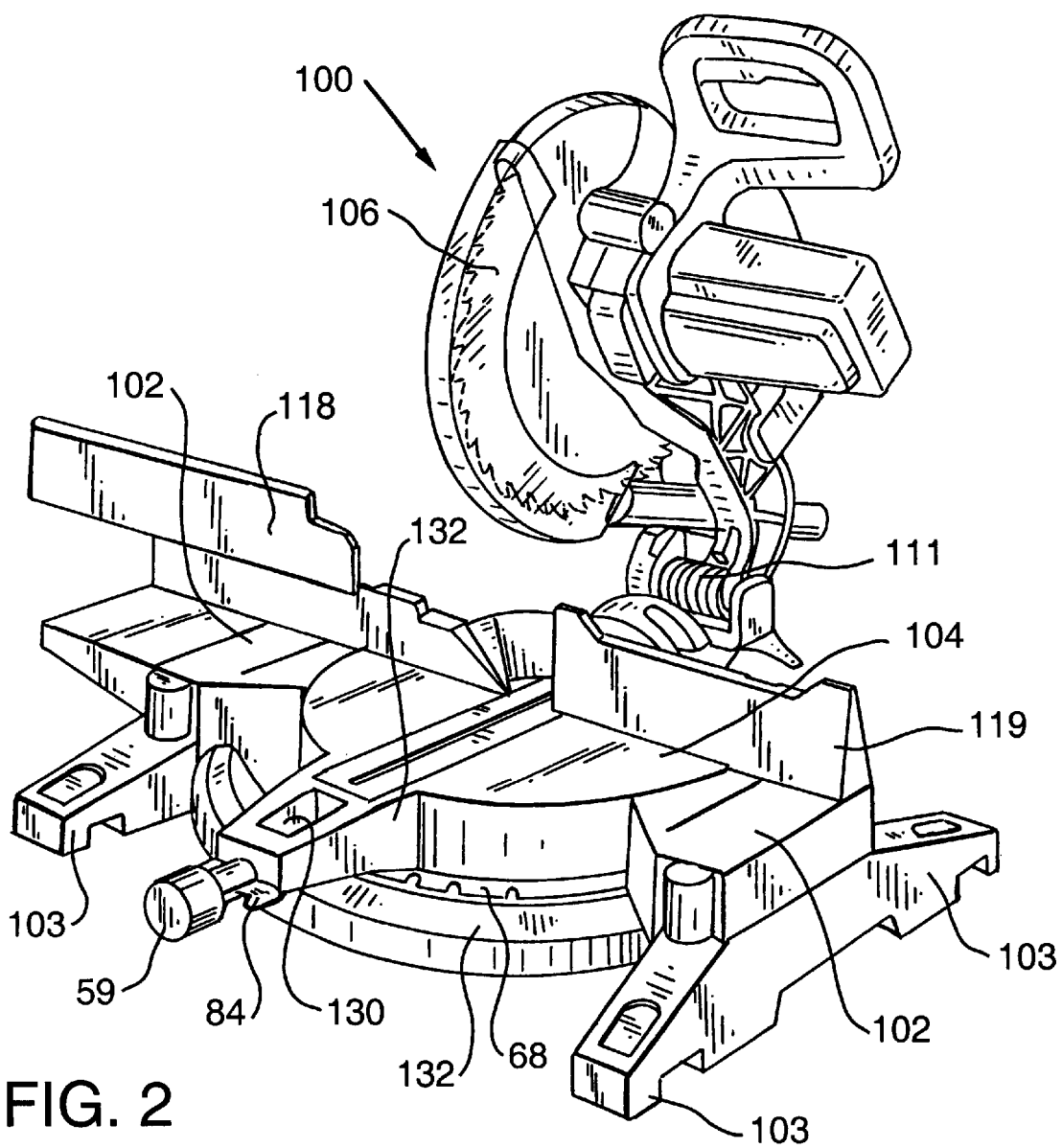
FIG. 2 is an additional perspective view of the miter saw of FIG. 1 showing certain elements of the adjustment mechanism embodiment.
Figure 3:
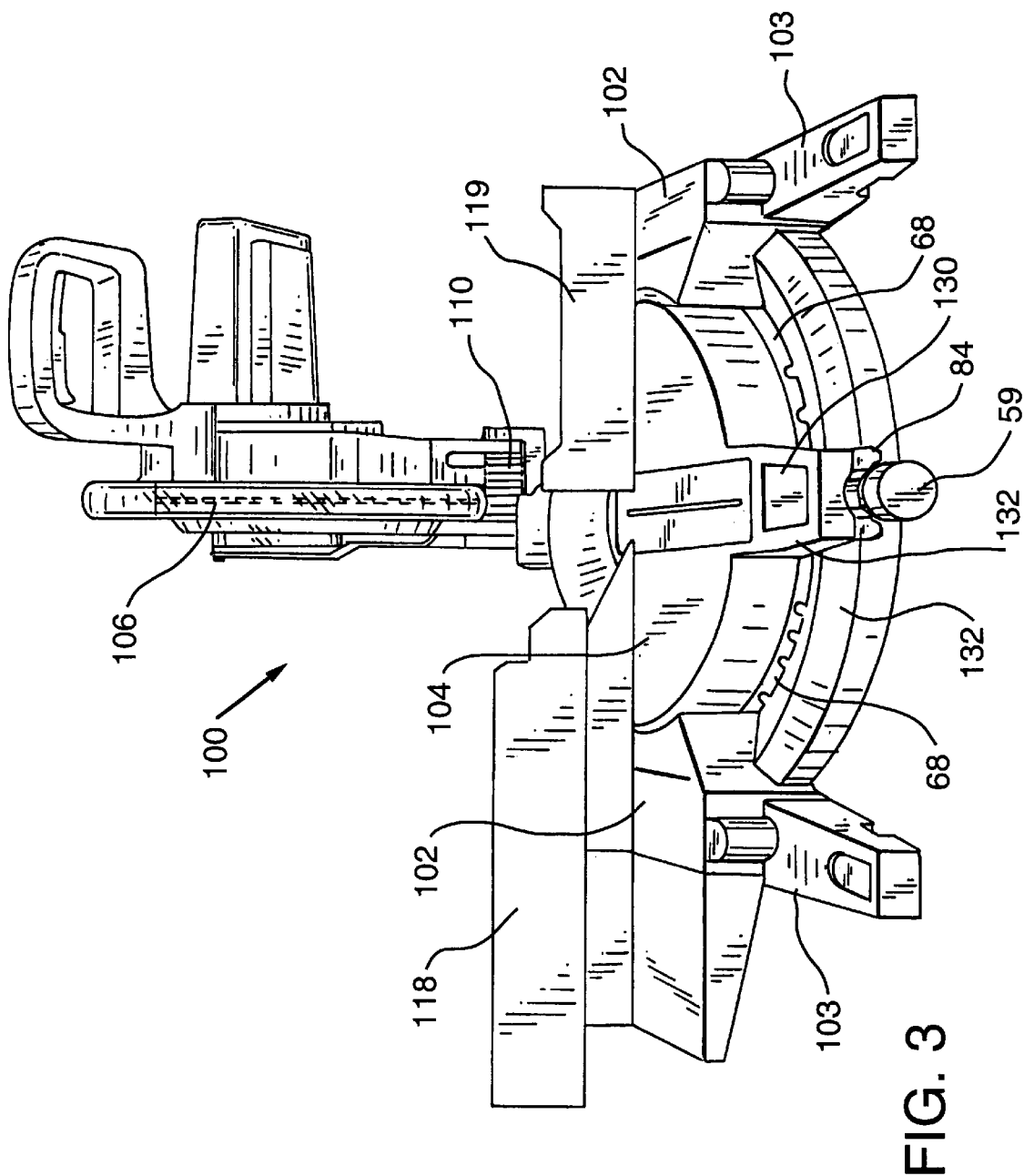
FIG. 3 is a front elevational view of the miter saw of FIG. 1 showing certain elements of the adjustment mechanism embodiment.
Figure 4:
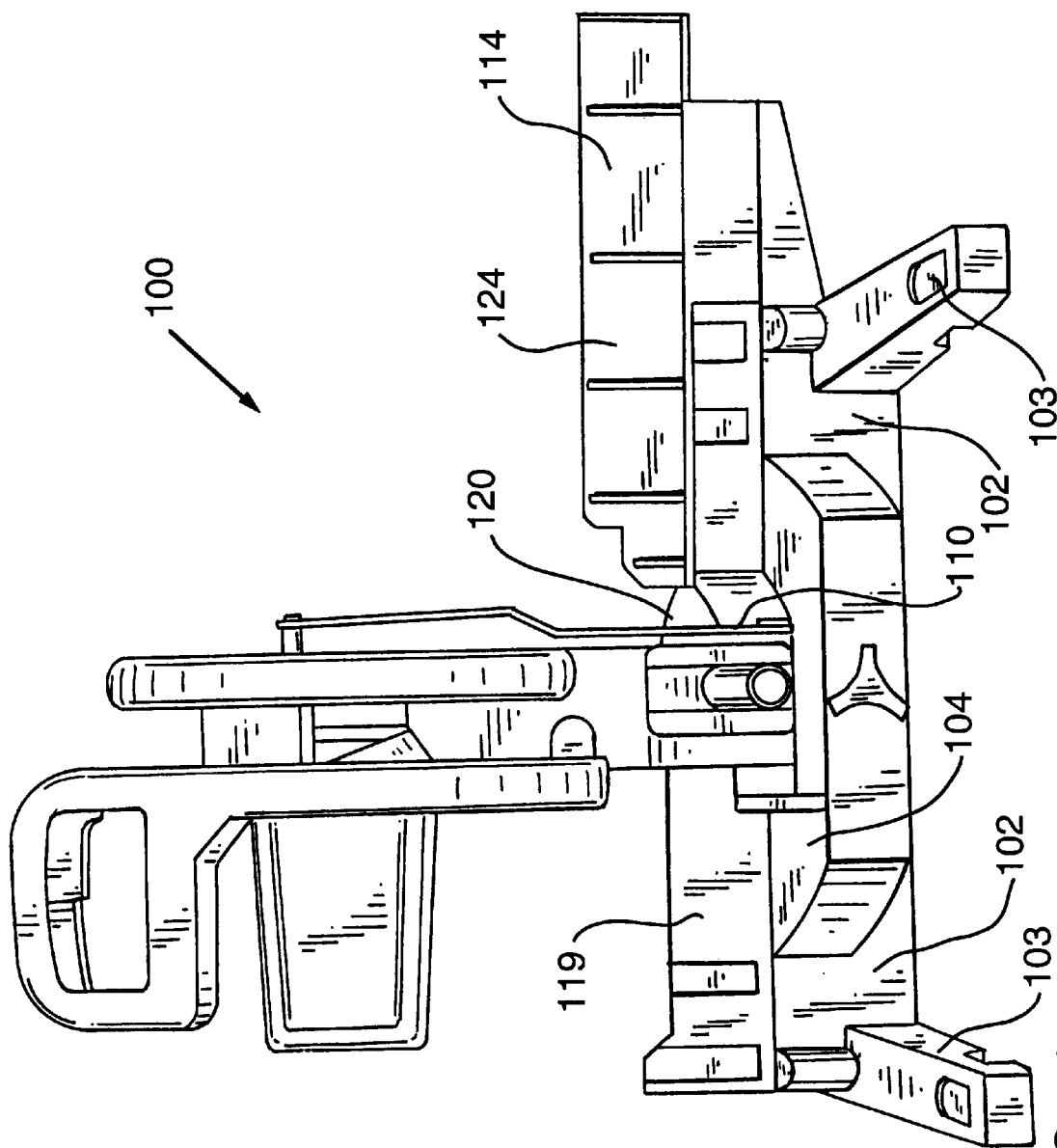
FIG. 4 is a rear elevational view of the miter saw of FIG. 1.
Figure 5:
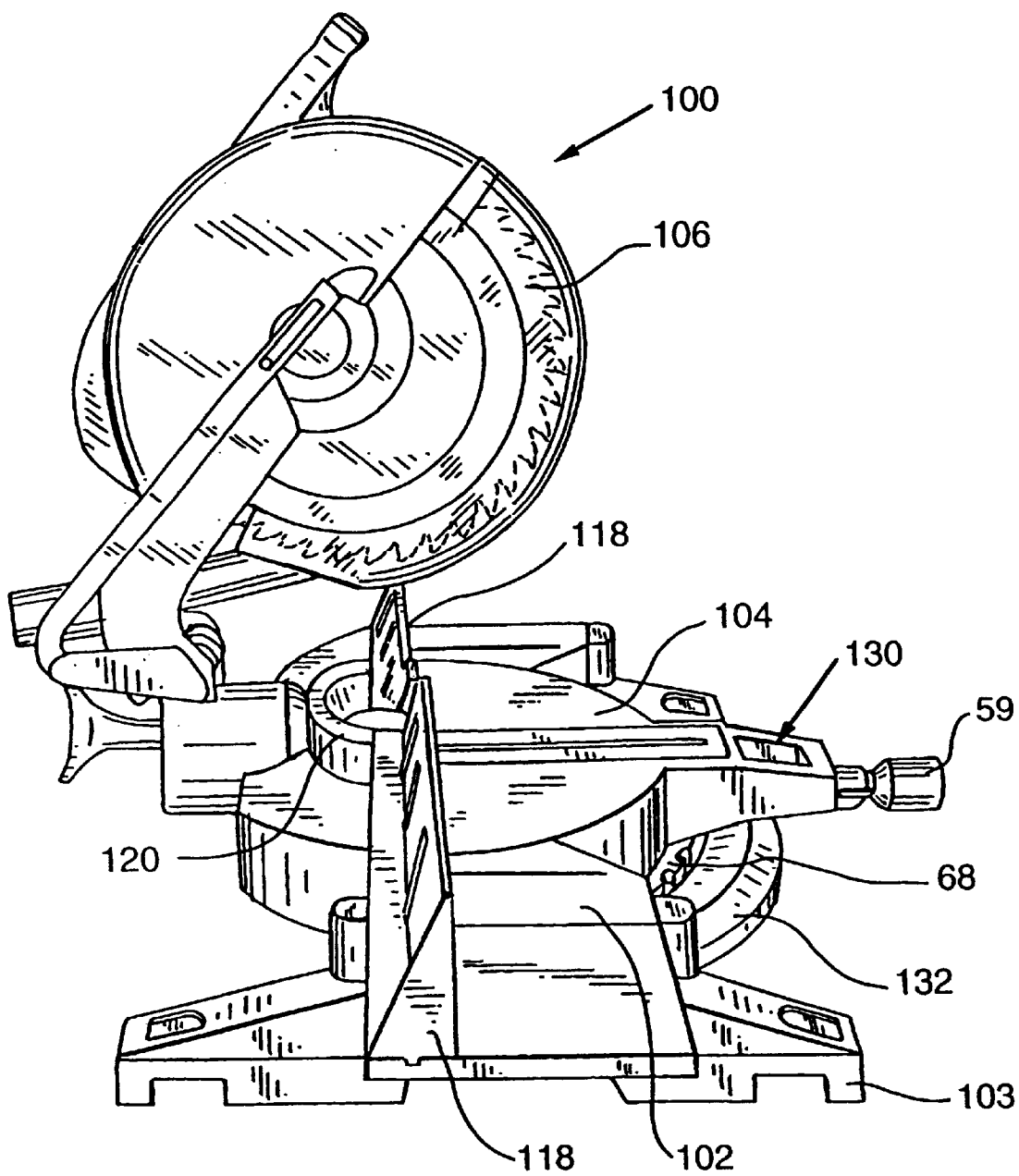
FIG. 5 is a left side perspective view of the miter saw of FIG. 1 showing certain elements of the adjustment mechanism embodiment.
Figure 6:
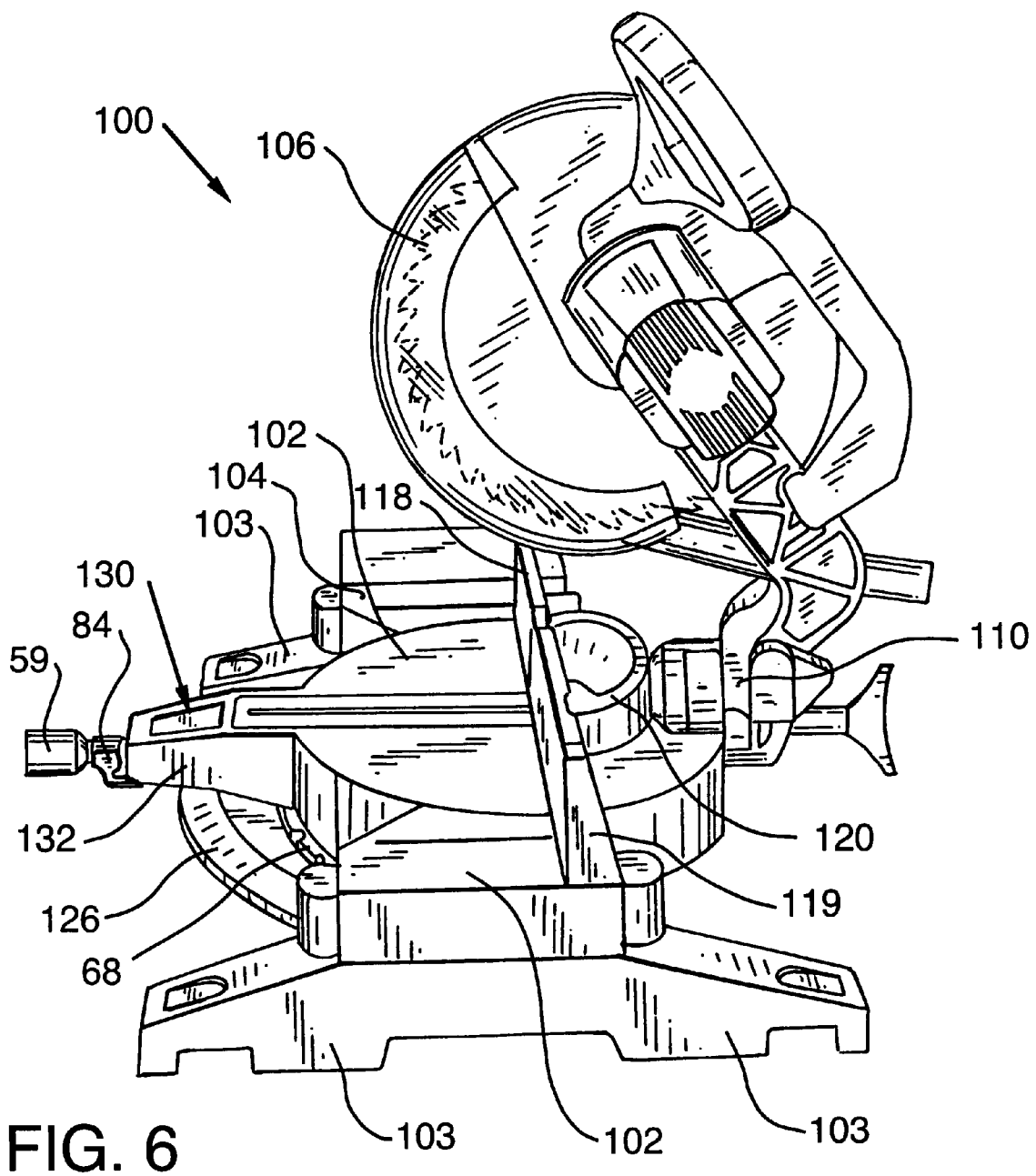
FIG. 6 is a right side perspective view of the miter saw of FIG. 1 showing certain elements of the adjustment mechanism embodiment.
Figure 7:
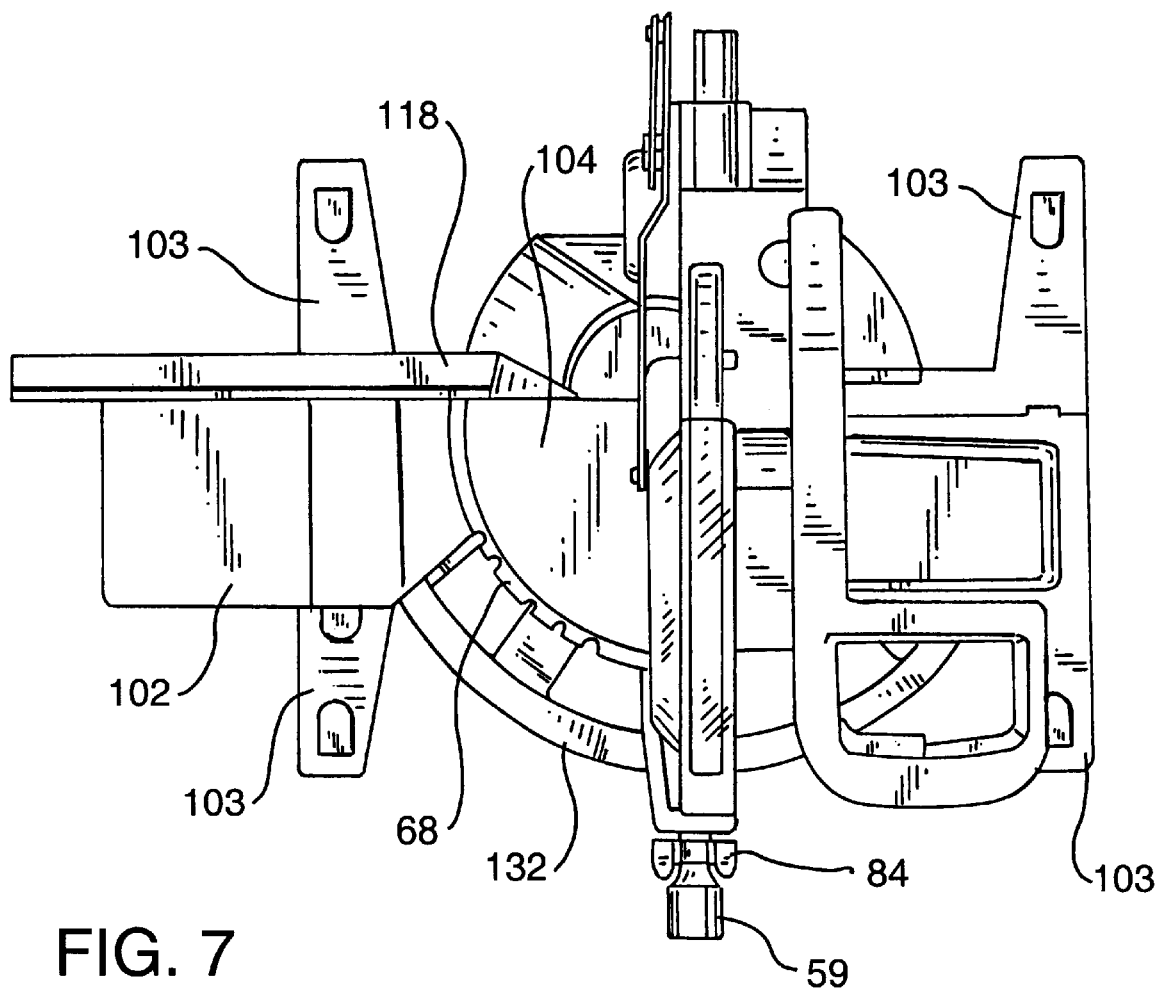
FIG. 7 is a top view of the miter saw of FIG. 1 showing certain elements of the adjustment mechanism embodiment.
Figure 8:
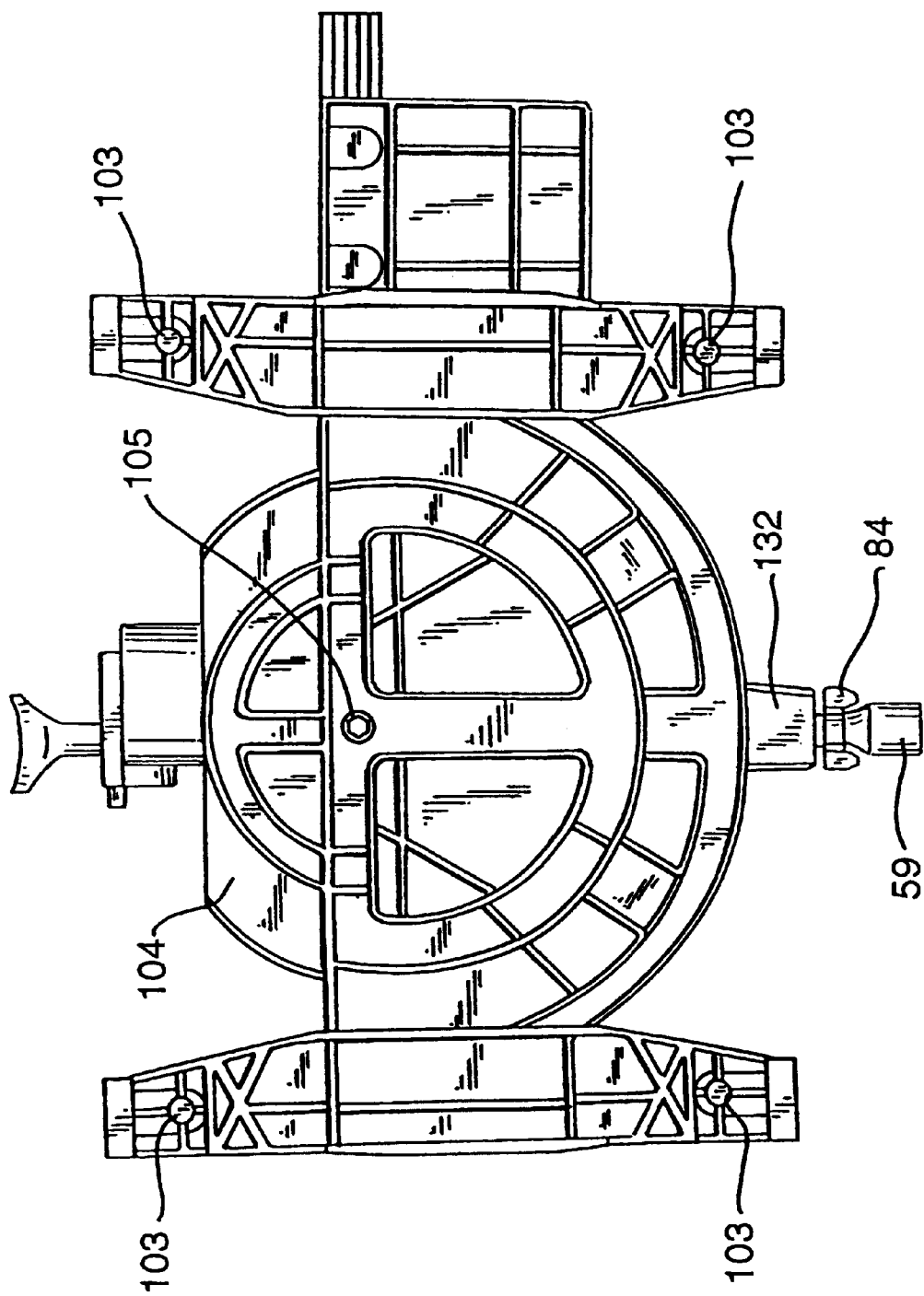
FIG. 8 is a bottom view of the miter saw of FIG. 1 showing certain elements of the adjustment mechanism embodiment.

The present invention is susceptible of embodiment in many different forms. This specification and the accompanying drawings provide only certain specific embodiments as examples of the invention. The invention is not intended to be limited to the embodiments so described, and the actual scope of the invention is better indicated by the appended claims. The adjustment mechanism of the present invention may be incorporated into certain otherwise conventional cutting and/or abrading devices, such as miter saws, and other devices. The details of those conventional devices, although not fully described or illustrated herein, will be apparent to those having ordinary skill in the art and may not be described herein.

Referring now to the drawings for the purpose of illustrating embodiments of the invention only and not for the purpose of limiting the same, FIGS. 1–29 generally show aspects of one embodiment of the present invention in the form of an adjustment mechanism 10 incorporated into a power operated miter saw 100. While the present invention is particularly well-suited for adjustment and locking of the relative positions of the table portion 104 and the base portion 102 of the miter saw 100, one of ordinary skill will appreciate that the adjustment mechanism 10 of the present invention may be successfully incorporated into myriad other devices in which the adjustment of the position of one element relative to another is desired.

With the exception of the adjustment mechanism 10 of the present invention, the general construction and operation of the miter saw 100 is well known in the art and will not be discussed in detail herein. Accordingly, only those conventional aspects of the miter saw 100 considered helpful to illustrate the herein-described embodiments of the present invention are discussed below.

Figure 9:
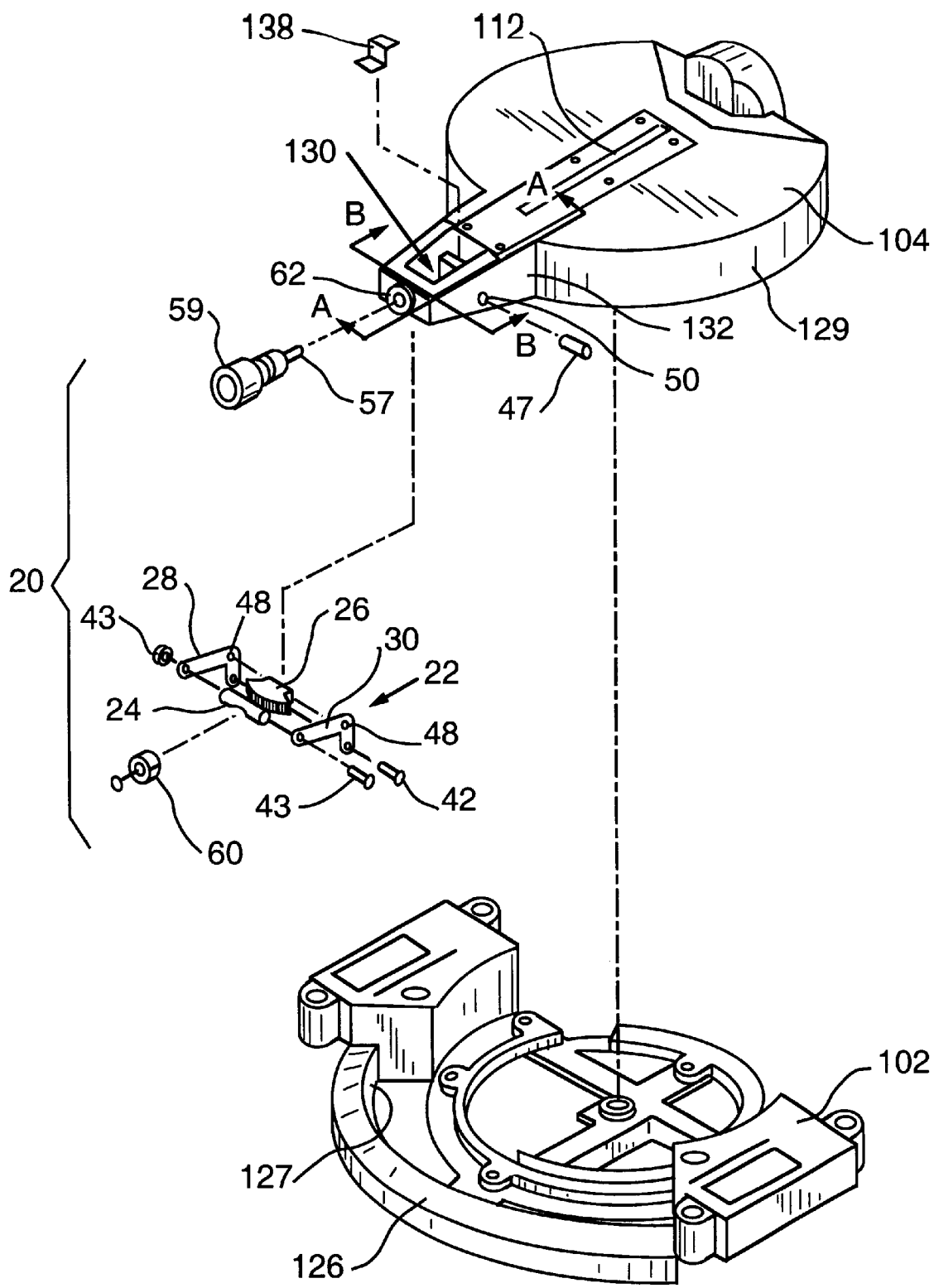
FIG. 9 is an assembly view of certain elements of the miter saw of FIG. 1, depicting certain elements of the locking mechanism of the adjustment mechanism embodiment.

As best shown in FIGS. 1–8, the miter saw 100 depicted in the accompanying drawings generally includes a base portion 102, a table portion 104, a cutting unit 106, and a workpiece guide in the form of a workpiece fence 114. The upper planar surfaces of the base portion 102 and the table portion 104 form a generally planar workpiece support surface 107. The base portion 102 includes a plurality of legs 103 extending therefrom. The legs 103 are adapted to rest upon a surface and provide support for the miter saw 100. As indicated in FIG. 9, the table portion 104 is rotatably seated within a recess in the base portion 102. The table portion 104 is rotatably attached to the base portion 102 by means of a pivot pin 105 (see FIG. 8) and is movably seated within the base portion 102 such that the table portion 104 is rotatable about an axis that is generally perpendicular to the plane of the horizontal workpiece support surface 107. The base portion 102 and table portion 104 are configured such that surfaces of the base portion 102 and the table portion 104 are aligned to form the workpiece support surface 107. The workpiece support surface 107 thus includes a first region, defined by the table portion 104, which is movable, and a second region, defined by the base portion 102, which is fixed. Adjustment and locking of the orientation of the table portion 102 relative to the base portion 104 is accomplished using the adjustment mechanism 10 of the present invention, as is described in greater detail below.

Again referring to FIG. 1, cutting unit 106 includes a circular cutting blade 108 and is adapted to pivot in the direction of the table portion 104 of the workpiece support surface 107. The pivotable connection between the cutting unit 106 and the table portion 104 is accomplished by mounting block 110 fixedly secured to the rear of the table portion 104. The mounting block 110 generally includes a spring mechanism 111 to bias the cutting unit 106 away from the table portion 104. Accordingly, it will be understood that the cutting unit 106 is pivotable along an arc toward and away from the workpiece support surface 107. It will further be understood that the cutting unit 106 may be provided with a handle 112 and may also include a stationary guard 115 to shield a portion of the cutting blade 108. In addition, the table portion 104 includes a cutting member slot 112 therein. The slot 112 is positioned to receive a portion of the cutting blade 108 when it is pivoted downward. Further, the mounting block 110 may include a mechanism to permit the mounting block 110 and the cutting unit 106 to laterally pivot relative to the table portion 104 so as to execute bevel cuts on a workpiece supported on the workpiece support surface 107.

The workpiece fence 114 includes two fence portions 118 and 119 connected by a bridge portion 120. The workpiece fence 114 is fixedly mounted to the base portion 102. The table portion 104 and the cutting unit 106 connected thereto are thus able to move relative to the workpiece guide 112. The bridge portion 120 is configured so that the cutting blade 108 does not contact the workpiece fence 114 regardless of the orientation of the cutting unit 106 relative to the table portion 104.

As illustrated in FIGS. 1 and 9, the base portion 102 further includes a guide ring 126. The guide ring 126 is concentrically oriented relative to the arcuate edge 129 of the table portion 104 and forms an arcuate surface. The table portion 104 also may include an extension 132 projecting from the arcuate edge 129 of the table portion 104 and which projects beyond the guide ring 126. The extension 132 may be equipped with a window 130 therein positioned above the guide ring 126 and enabling the portion of the guide ring 126 lying below the extension 132 to be viewed by the operator of the miter saw 100. The guide ring 126 typically includes an arcuate scale 128 thereon. The scale 128 may be calibrated such that the position on the scale 128 indicated by the window 130 will identify the miter angle defined by the relative positions of the table portion 104 and the base portion 102. In other words, the scale 128 indicates the miter angle of a cut that the cutting member 106 would make on a workpiece held against the workpiece guide 114.

In operation, the base portion 102 will typically be disposed on a table or work bench such that the workpiece support surface 107 is in a generally horizontal orientation. The operator of the saw 100 first positions the cutting unit 106 to the desired miter angle relative to the workpiece guide 114 by adjusting the orientation of the table portion 104 relative to the base portion 102. To orient the table portion 104 relative to the base portion 102, the adjustment mechanism 10 is first placed to an "open" configuration such that the table portion 104 may be rotated relative to the base portion 102. The angular orientation of the cutting member 106 relative to the workpiece guide 114 is indicated by the reading on the arcuate scale 128. The table portion 104 is then restrained from further movement relative to the base portion 102 by placing the adjustment mechanism 10 in a "closed" configuration. As is know in the art, the saw 100 also may include means for adjusting the bevel angle of the cutting unit 106 to perform compound miter cuts. Once the miter and bevel angles have been adjusted as discussed above, the operator may place a workpiece on the workpiece support surface 107 so as to abut the workpiece guide 114. The operator may then power up the cutting unit 106 and pivot the cutting member 106 toward the workpiece support surface 107, making the desired cut in the workpiece. As the cutting member 106 exits the workpiece, the leading edge of the cutting blade 108 passes into the slot 112. Once the cut is complete, the operator allows the cutting unit 106 to pivot upwardly.

The construction of the adjustment mechanism 10 for releasibly restraining movement of the table portion 104 relative to the base portion 102 will now be described. The adjustment mechanism 10 of the present invention generally includes a locking mechanism 20 and an indexing mechanism 64. The locking mechanism 20 provides for releasable locking of the table portion 104 at any of the many allowable rotational positions of the table portion 104 relative to the base portion 102. In contrast, the indexing mechanism 64 locks the table portion in one of a finite number of predetermined miter positions relative to the base portion 102. FIGS. 9–18 illustrate various elements of the miter saw 100 and particularly show elements of the locking mechanism 20. FIGS. 19–25 also illustrate various elements of the miter saw 100 and particularly show elements of the indexing mechanism 64 of the present invention 10. It will be understood that, while elements of the indexing mechanism 64 have been removed from certain figures for the purpose of more clearly depicting the operation of the locking mechanism 20, and while elements of the locking mechanism 20 above have been omitted from certain figures for the purpose of more clearly depicting the operation of the indexing mechanism 64, the adjustment mechanism 10 of the present invention need not include both the locking mechanism 20 and the indexing mechanism 64. Preferably, however, both the locking mechanism 20 and the indexing mechanism 64 are incorporated into the adjustment mechanism of the invention.

The locking mechanism 20 is disposed on the table portion 104 and is adapted to provide frictional contact with the guide ring 126 of the base portion 102 so as to releasably secure the table portion 104 relative to the base portion 102. In particular, as shown in FIG. 9, the locking mechanism 20 generally includes a frame 22 pivotally mounted to the extension 132 of the table portion 104, and an actuating mechanism adapted to bias the frame 22 between the open configuration (FIGS. 13 and 15), in which the table portion 104 may change orientation by rotating relative to the base portion 102, and the closed configuration (FIGS. 14 and 16) in which the table portion 104 is held in a fixed position relative to the base portion 102.

Figure 10:
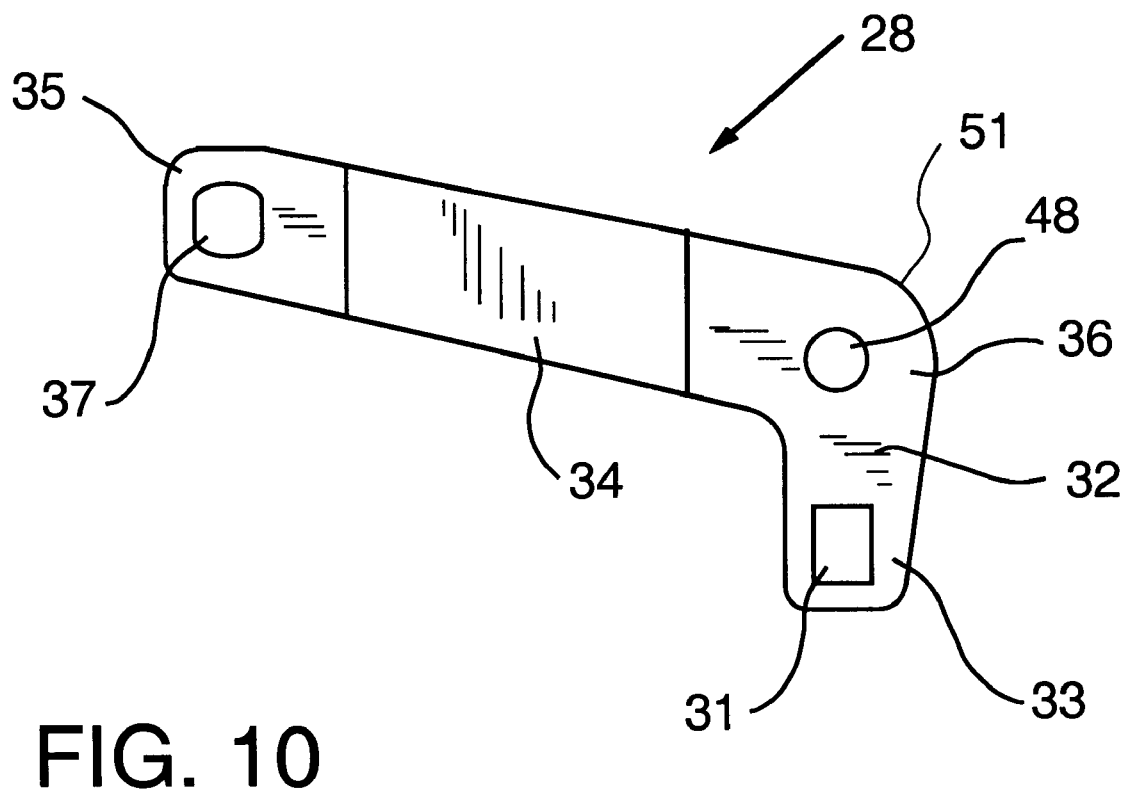
FIG. 10 is a depiction of a lock bar strap of the locking mechanism of the adjustment mechanism embodiment shown in FIG. 9.
Figure 11C:
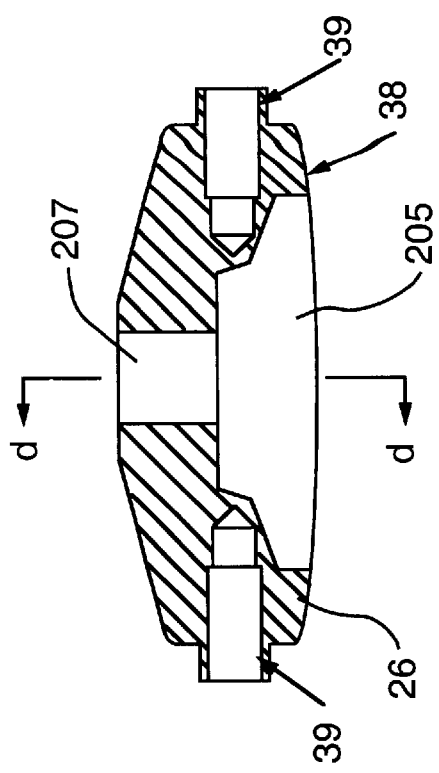
FIGS. 11(a)–(d) are various views of the locking bar of the locking mechanism of the adjustment mechanism embodiment shown in FIG. 9.
Figure 11D:
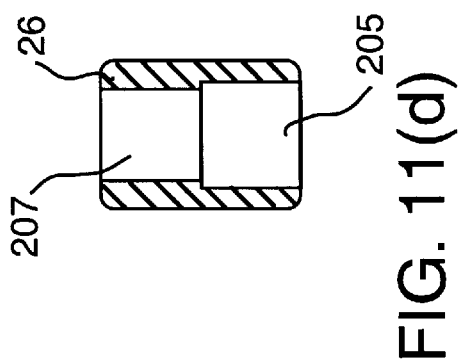
Figure 11B:
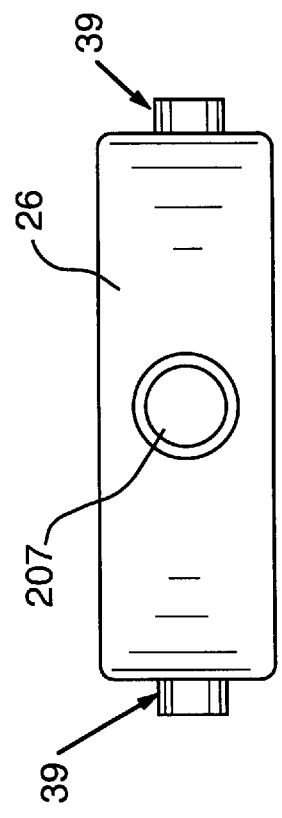
Figure 11A:
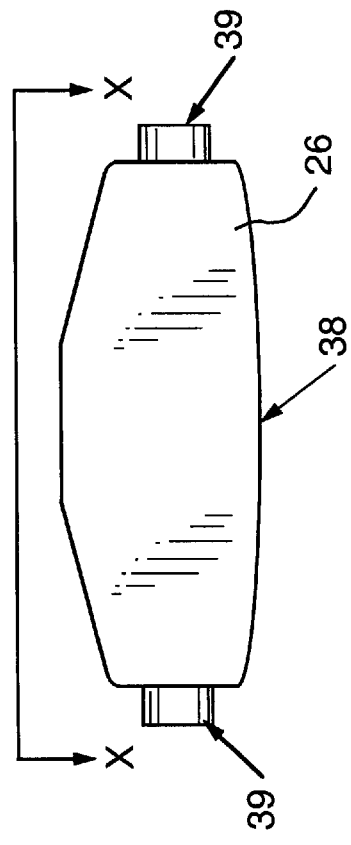

The frame 22 of the locking mechanism 20 generally includes a locking bar 26 and a cam bar 24 fixedly joined to a pair of lock bar straps 28 and 30. Lock bar strap 28 is shown in FIG. 10. It will be understood that each lock bar strap 28 and 30 is a mirror image of the other. Thus, like numbers are used herein to refer to like structures on each of the lock bar straps 28 and 30. As shown in particular in FIG. 10, the lock bar straps 28 and 30 are generally "L" shaped members defining first and second arms 32 and 34, respectively. The first and second arms 32 and 34 are joined at one end thereof at a pivot point 36. The other ends 33 and 35 of the first and second arms 32 and 34, respectively, are fixedly joined to ends of the locking bar 26 and cam bar 24, respectively.

Figure 29C:
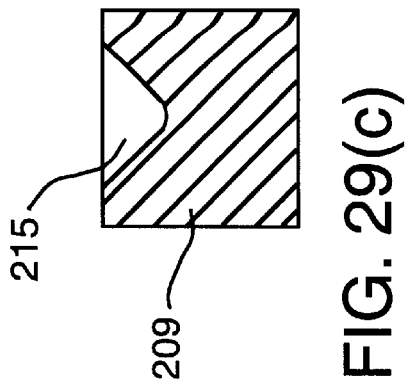
FIGS. 29(a)–(c) are depictions of various views of the pressure pad of the locking mechanism of the adjustment mechanism embodiment shown in FIG. 9.
Figure 29A:
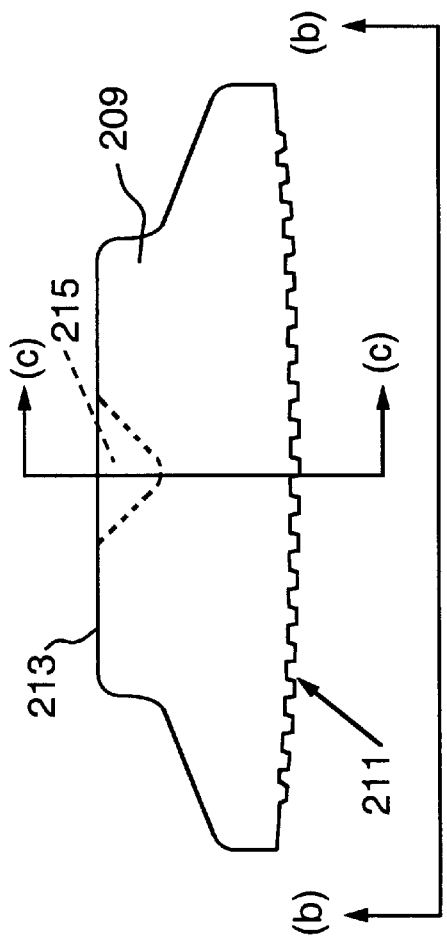
Figure 29B:
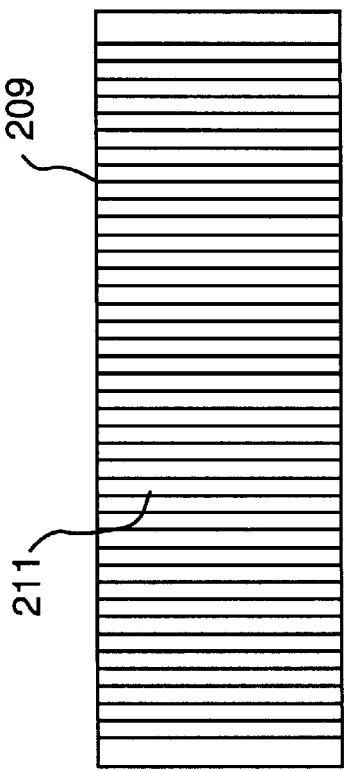

As shown in particular in FIG. 11, the locking bar 26 includes an elongate rod having a cross-section in the general shape of a parallelogram. One of the surfaces of the locking bar 26 includes a convex bow defining a locking surface 38. The locking surface includes a recess 205. The locking bar 26 also includes a cylindrical bore 207 which intersects the recess 205. The recess 205 receives a pressure pad 209 which is shown in detail in FIG. 29. With regard to FIG. 11, FIG. 11(a) is a side elevational view of the locking bar 26. FIG. 11(b) is a top view of the locking bar 26 taken in the direction of X—X of FIG. 11(a). FIG. 11(c) is a cross section through the locking bar 26 taken along the line segment X—X of FIG. 11(a). Finally, FIG. 11(d) is a cross section through the center of the locking bar 26 in the direction of line segment (d)—(d) of FIG. 11(c). As shown in FIG. 29, the pressure pad 209 is shaped to be closely received by the recess 205 of the locking bar 26. FIG. 29(a) is a side elevational view of the pressure pad 209. The pressure pad 209 includes a serrated face 211 and also includes a conical recess 215. The conical recess 215 is also shown in FIG. 29(c), which is a cross section through the center of the pressure pad 209 taken generally along the line segment (c)—(c) of FIG. 29(a). When the pressure pad 209 is disposed within the recess 205 of the locking bar 26, the conical recess 215 is aligned with the cylindrical recess 207. The cylindrical recess 207 receives a threaded set pin (not shown) having a tip which is received within the conical recess 215 of the pressure pad 209. Pending upon the position of the set pin within the cylindrical recess 207, the tip of the set pin may abut and push on the apex of the conical recess 215. Accordingly, it will be understood that by advancing or retreating the set pin within the cylindrical recess 207, the serrated surface 211 of the pressure pad 209 may be caused to change position relative to the surface 38 of the locking bar 26. Also, because the point of contact between the pressure pad 209 and the set pin is at the tip of the set pin, the pressure pad 209 may slightly pivot within the recess 205 of the locking bar 26.

Figure 12C:
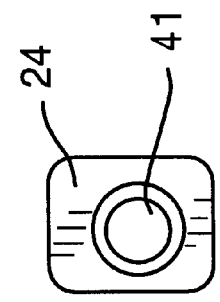
FIGS. 12(a)–(c) are various views of the cam bar of the locking mechanism of the adjustment mechanism embodiment shown in FIG. 9.
Figure 12B:
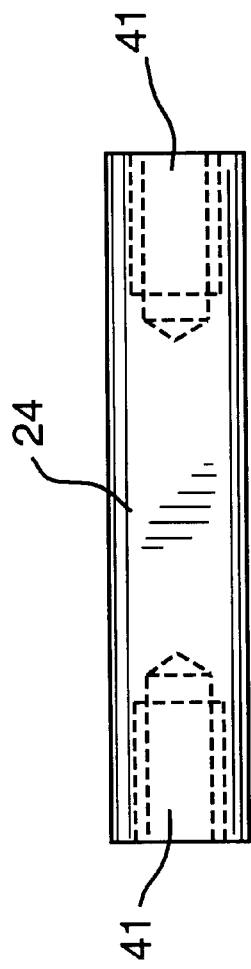
Figure 12A:
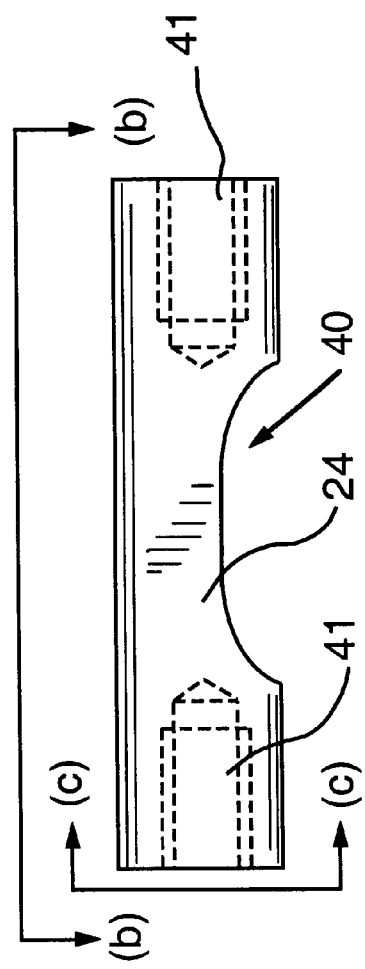
Figure 13:
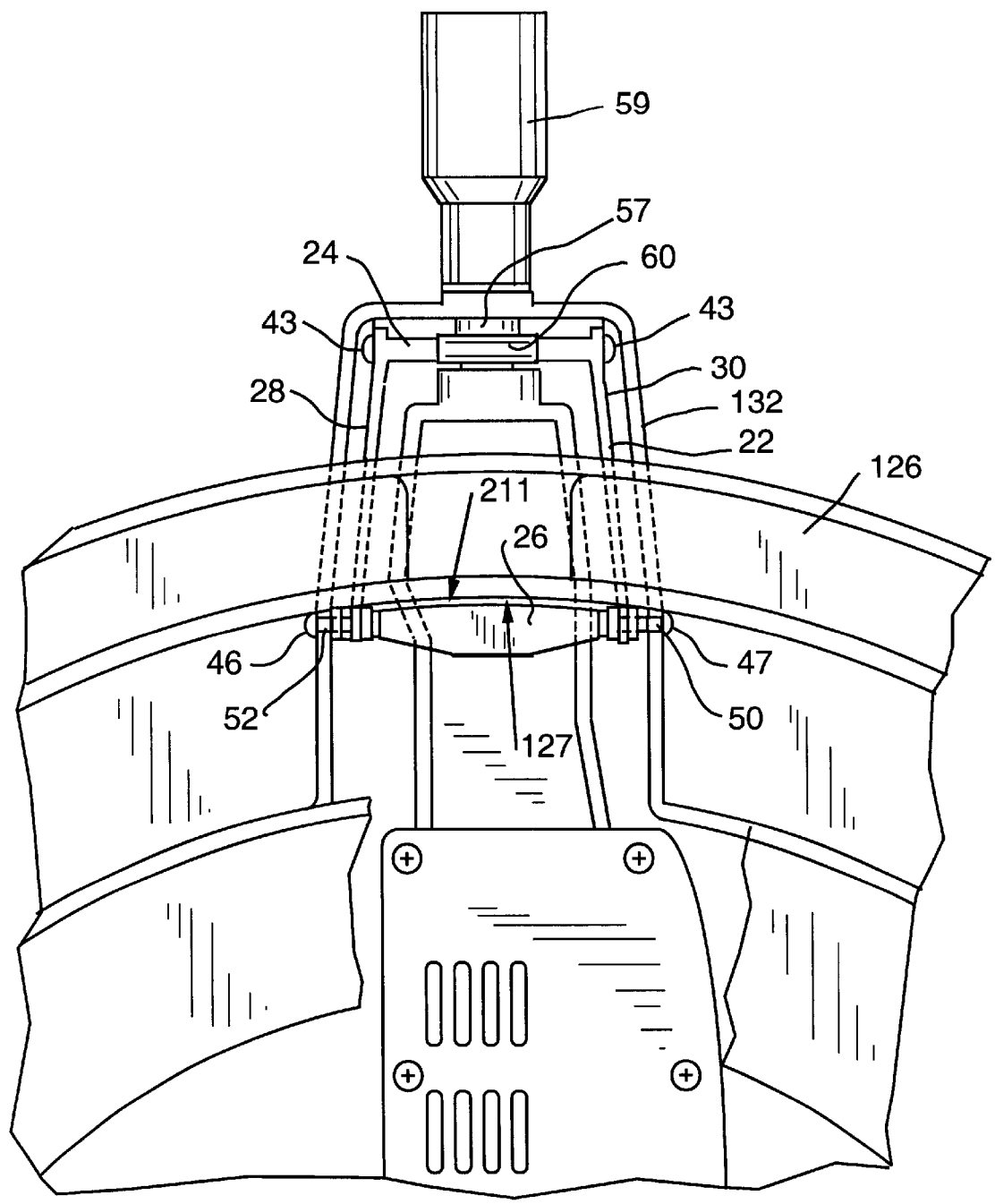
FIG. 13 is a bottom view of a portion of the miter saw of FIG. 1, particularly showing certain elements of the locking mechanism of the adjustment mechanism embodiment disposed in an open configuration.
Figure 14:
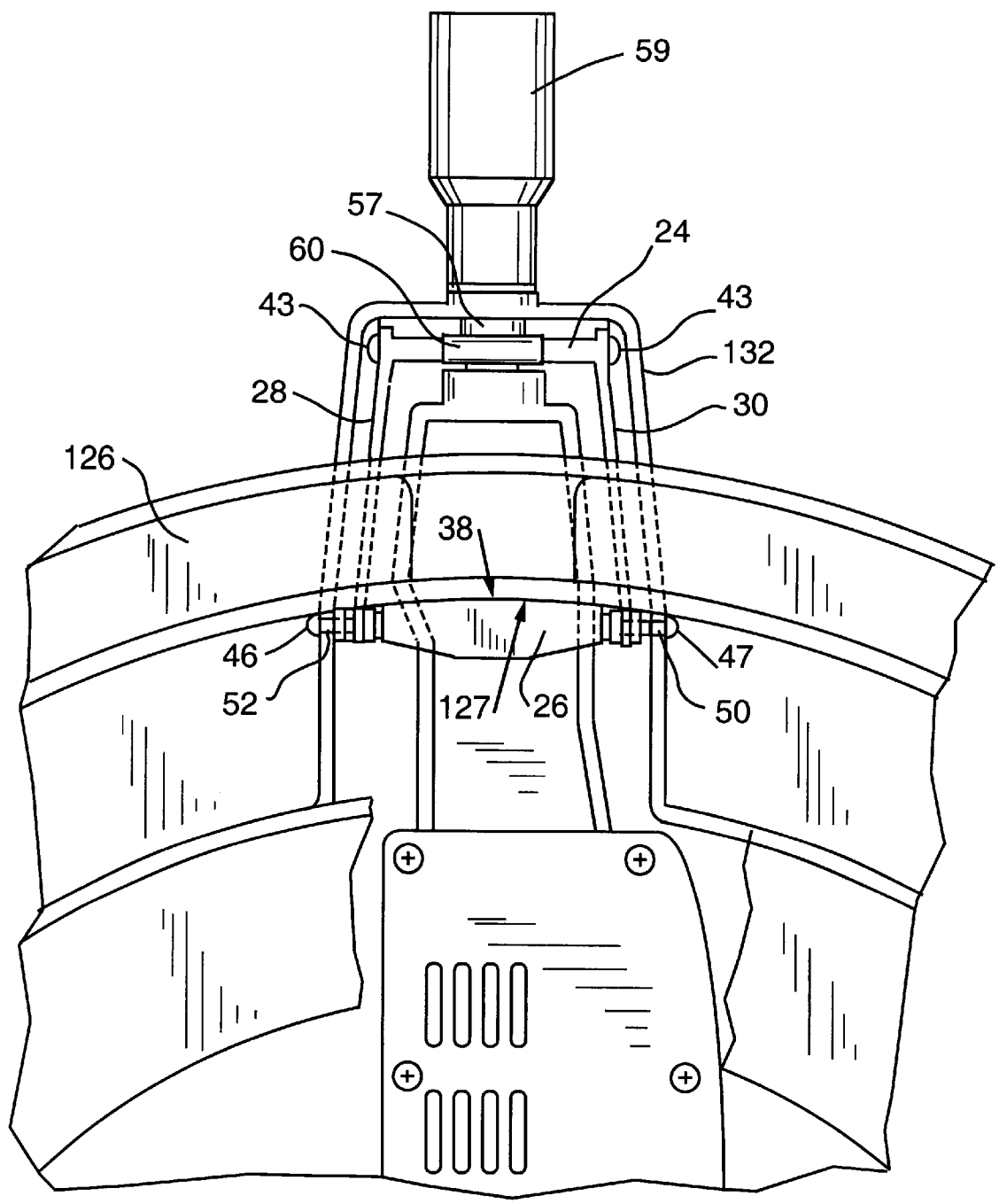
FIG. 14 is a bottom view of the miter saw portion shown in FIG. 13, with certain elements of the locking mechanism disposed in a closed configuration.
Figure 15:
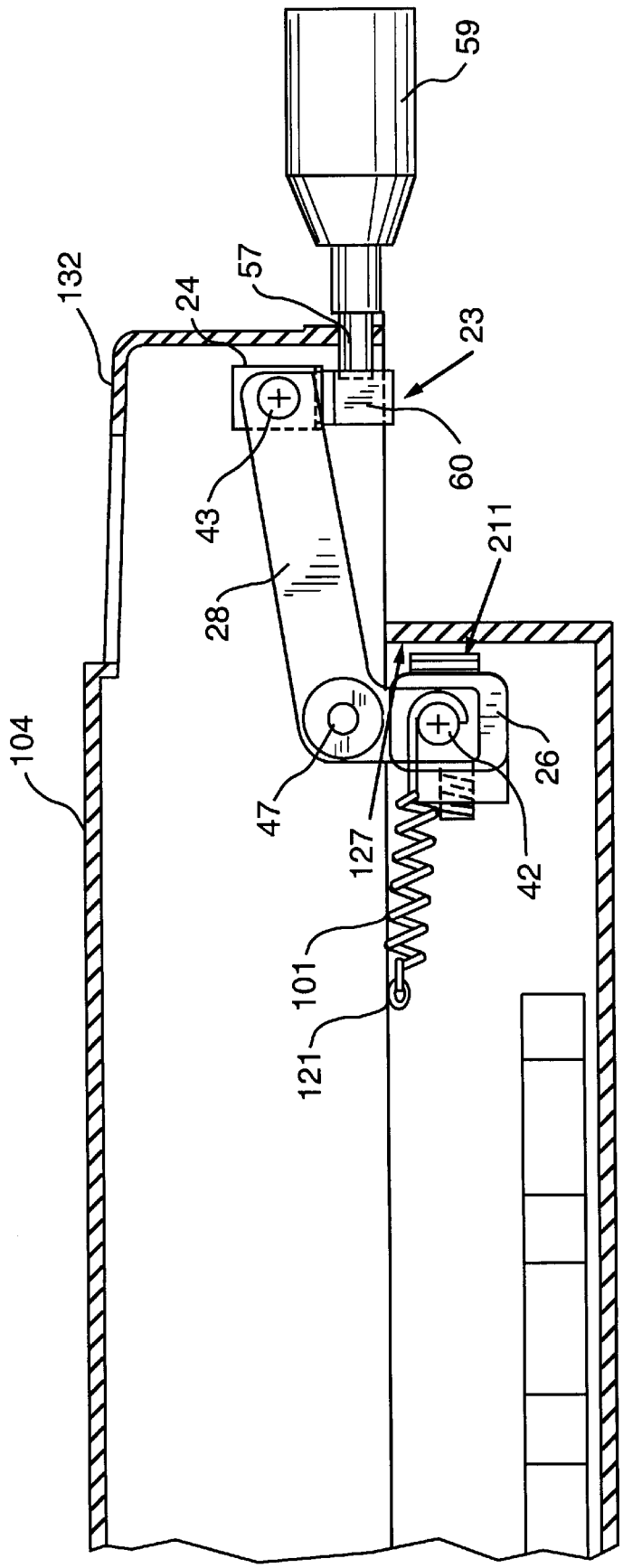
FIG. 15 is a partial cross-sectional view of a portion of the miter saw of FIG. 1, taken along the line A—A in FIG. 9, and illustrating certain elements of the locking mechanism disposed in an open configuration.
Figure 16:
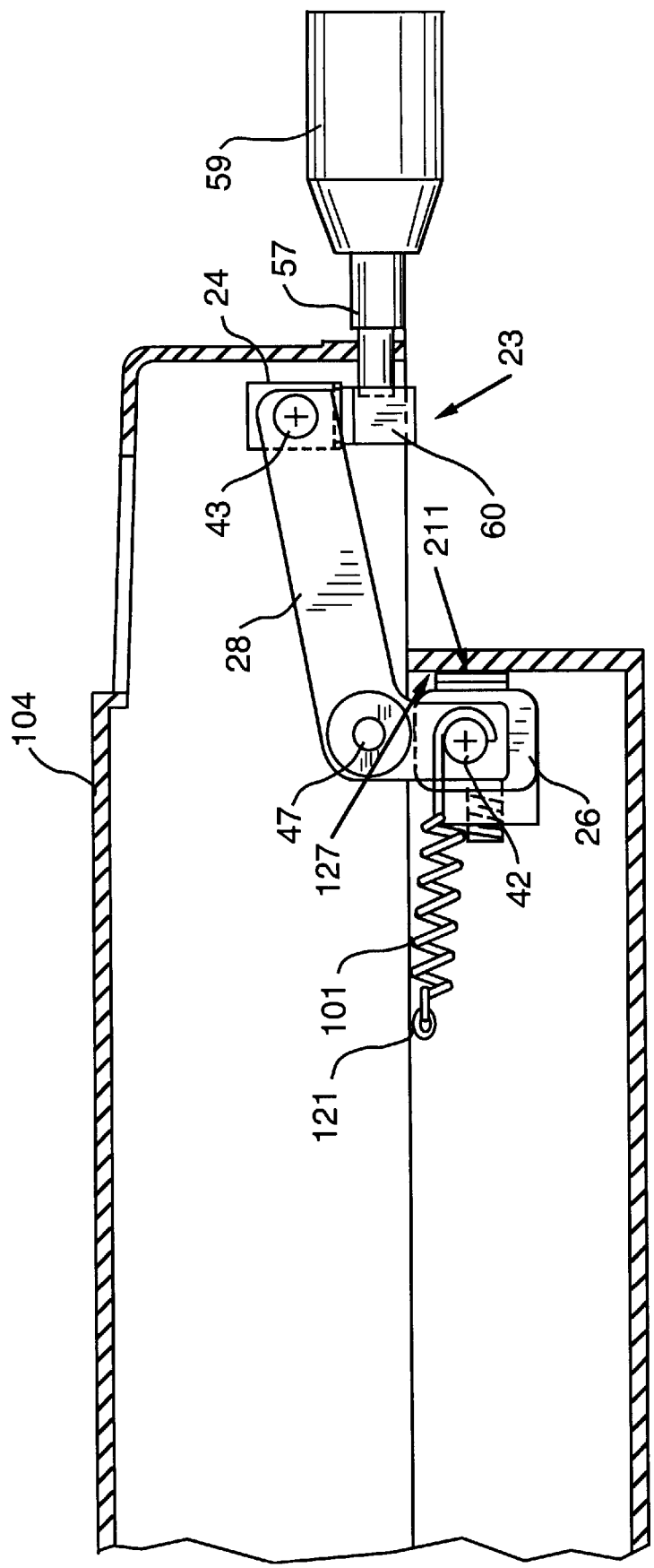
FIG. 16 is a partial cross-sectional view of a portion of the miter saw of FIG. 1, taken along the line A—A in FIG. 9, and illustrating certain elements of the locking mechanism disposed in a closed configuration.
Figure 17:
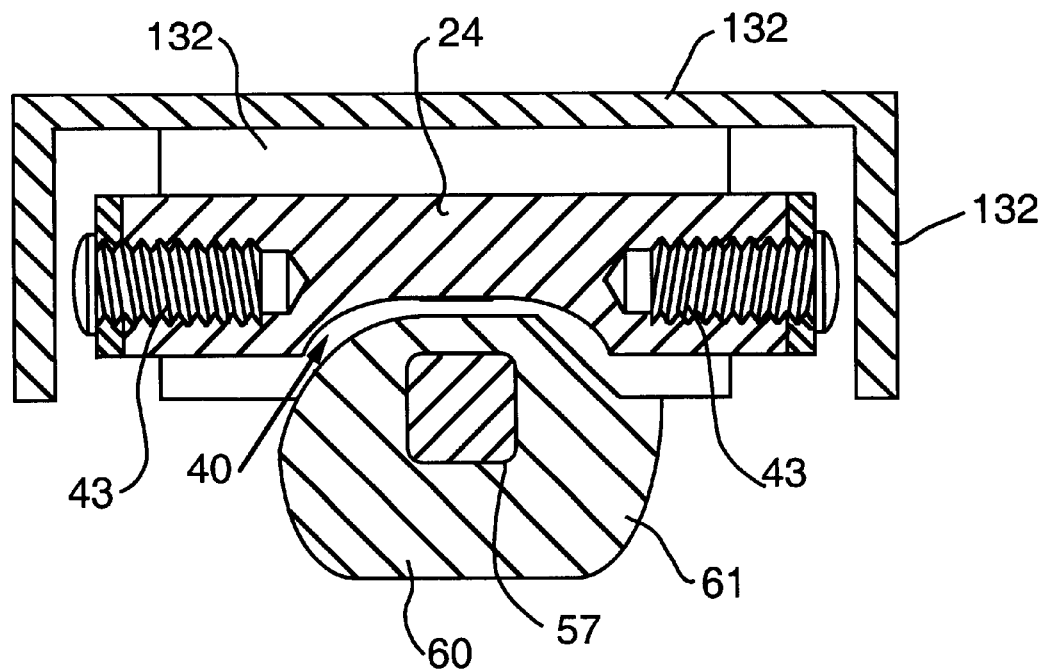
FIG. 17 is a partial cross-sectional view of a portion of the miter saw of FIG. 1, taken along the line B—B shown in FIG. 9, and illustrating certain elements of the locking mechanism of the adjustment mechanism embodiment disposed in an open configuration.
Figure 18:
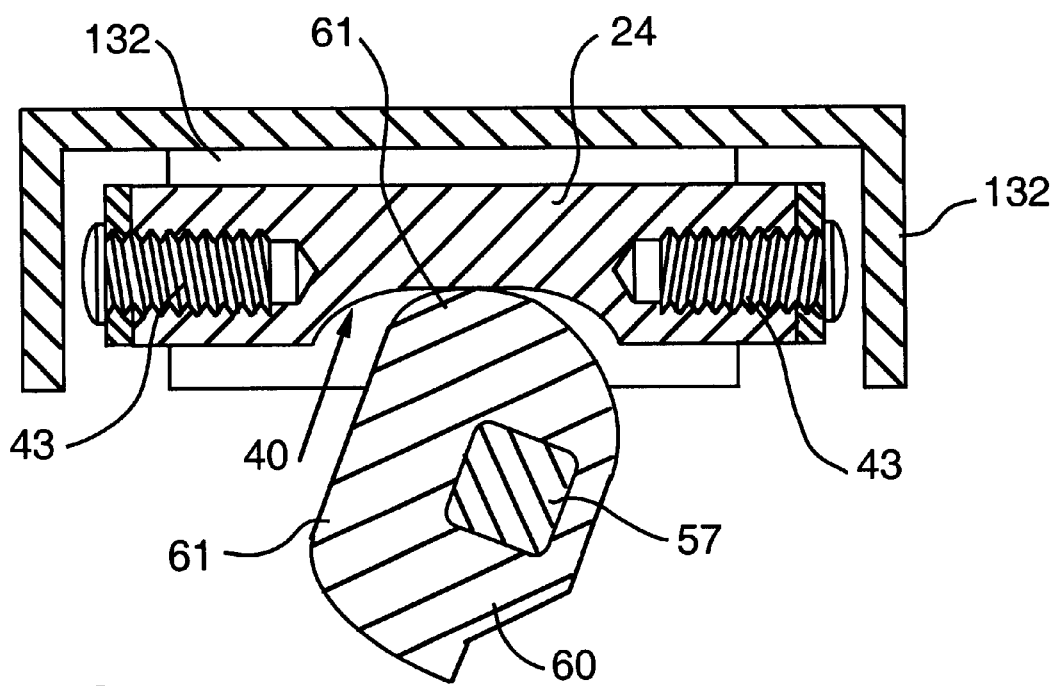
FIG. 18 is a partial cross-sectional view of a portion of the miter saw, of FIG. 1 taken along the line B—B shown in FIG. 9, and illustrating certain elements of the locking mechanism of the adjustment mechanism embodiment disposed in a closed configuration.
Figure 19:
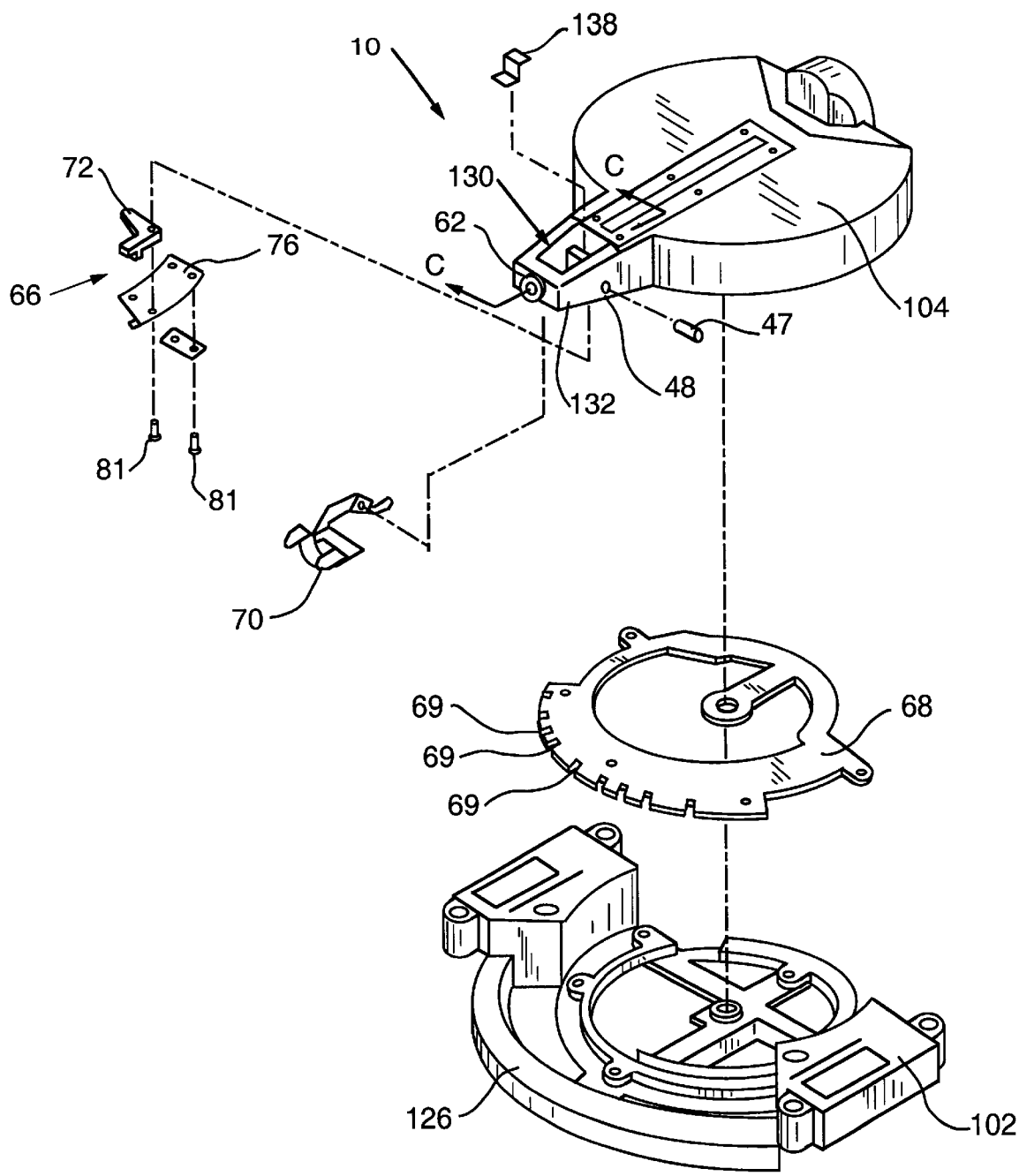
FIG. 19 is an assembly view of certain elements of the miter saw of FIG. 1, particularly showing certain elements of the indexing mechanism of the adjustment mechanism embodiment.

As shown in particular in FIG. 12, the cam bar 24 has a cross-section in the general shape of a parallelogram. One of the surfaces of the cam bar 24 includes a recess defining a camming surface 40. The significance of the camming surface 40 will be described in greater detail below.

The frame 22 of the locking mechanism 20 is provided by securing the locking bar 26 and cam bar 24 to the lock bar straps 28 and 30, as is indicated in FIG. 9. In particular, each of the ends 33 and 35 of the lock bar straps 28 and 30, respectively, include an eyelet 31 and 37 therethrough. The ends of the locking bar 26 each further include a threaded bore 39 therein, and the ends of the cam bar 24 each include a threaded bore 41 therein. The bores 39 and 41 generally correspond to the eyelets 31 and 37, respectively, when the lock bar straps 28 and 30, locking bar 26, and cam bars 24 are assembled. Accordingly, the bores 39 in each of the ends of the locking bar 26 are aligned with the eyelet 31 in each of the lock bar straps 28 and 30, and threaded connectors 42 are threaded through the eyelet 31 and into the bores 39 to secure the locking bar 26 to the lock bar straps 28 and 30. Similarly, the bores 41 in each of the ends of the cam bar 24 are aligned with the eyelet 37 in each of the lock bar straps 28 and 30, and threaded connectors 43 are threaded through the eyelets 37 and into the bores 41 to secure cam bar 26 to the lock bar straps 28 and 30. The threaded connectors 42 may be formed from a pan head screw or other equivalent structure and generally include a bushing mounted in conjunction therewith. However, it will be understood by the skilled artisan that alternate means of connecting the locking bar 26 and cam bar 24 to the lock bar straps 28 and 30 to form the frame 22 are available, such as rivets and welds, and that such alternate means will effectively function in the present invention.

As shown in particular in FIGS. 13–16, the frame 22 formed by the locking bar 26, cam bar 24, and lock bar straps 28 and 30 is pivotably mounted about pivot pins 46 and 47 within a recess formed by the extension 132 of the table portion 104. In particular, each pivot point 36 of each of the lock bar straps 28 and 30, respectively, is provided with a pivot bore 48 and includes a shoulder portion 51. The extension 132 of the table portion 104 is provided with mounting bores 50 and 52 therethrough generally corresponding in size to the pivot bores 48. The pivot pins 46 and 47 are disposed within the mounting bores 50 and 52, respectively, and the frame 22 is pivotably journaled about the pivot pins 46 and 47 on the annular shoulder portion 51 of each lock bar strap 28 and 30.

The frame 22 of the locking member 20 is positioned such that the serrated surface 211 of the pressure pad 209, when positioned within the recess 205 in the locking bar 26, is adjacent to and in close communication with the inner arcuate surface 127 of the guide ring 126. As the frame 22 pivots about the pivot pins 46 and 47, the surface 211 is positioned in either the open configuration (See FIGS. 13 and 15) or the closed configuration (See FIGS. 14 and 16).

In the open configuration, the surface 211 is not drawn into contact with the arcuate inner surface 127. In the closed configuration, the surface 211 is pivoted into forceful frictional contact with the arcuate inner surface 127. The friction generated between the surface 211 and the arcuate inner surface 127 when the locking mechanism 20 is in the closed configuration is sufficient to hold the locking bar 26 in a fixed position relative to the arcuate inner surface 127, thereby holding table portion 104 in fixed position relative to the base portion 102. It will thus be appreciated by the ordinarily skilled artisan that, in operation, the locking mechanism 20 may be placed in the open configuration and the table portion 104 may be pivoted to a desired angle relative to the base portion 102. The locking mechanism 20 is then returned to the closed configuration, and the table portion 104 is thereby locked in place relative to the base portion 102. It will further be appreciated that the surface 211 is preferably slightly convex to correspond with the arc of the arcuate inner surface 127, thereby maximizing the contact area of and the friction between the pressure pad 209 and the arcuate inner surface 127 when the locking mechanism 20 is in the closed configuration.

The locking mechanism 20 is generally biased to assume the open configuration by biasing spring 101. Biasing spring 101 is connected at one end to the threaded connector 42 of locking mechanism 20 and is anchored at the other end to the table portion 104 by anchor 121. The actuation of the locking mechanism 20 between the open and closed configurations is controlled by the actuating mechanism, which is indicated generally as 23 in FIGS. 15 and 16. The actuating mechanism 23 generally includes an elongate axle 57 having a cam 60 and a manipulable knob 59 fixedly mounted at either end thereof. The axle 57 is rotatably seated within a bore 62 in the front surface of the extension 132 of the table portion 104 such that one end of the axle 57 extends into the extension 132 and the other end, having the knob 59 thereon, protrudes therefrom. The cam 60 is mounted on the end of the axle 57 within the extension 132 such that the cam 60 is positioned within the arc formed by the camming surface 40 of the cam bar 24. The cam 60 generally defines a cam surface fixedly mounted relative to the axle 57 and having a cam lobe 61 thereon.

Both the knob 59 and the cam 60 are rotated along with the axle 57. Accordingly, rotation of the knob 59 in either direction causes the axle 57 and the cam 60 thereon to rotate. Rotation of the cam 60 causes the cam 60 to interact with the camming surface 40 of the cam bar 24, thereby actuating the locking mechanism 20 between the open and closed configurations. In particular, when the cam 60 is rotated in a first direction, the cam lobe 61 contacts the camming surface 40 (see FIGS. 14, 16, and 18), and the cam lobe 61 displaces the cam bar 24 and pivots the locking mechanism 20 about pivot pins 46 and 47 against the force of the biasing spring 101 from the open configuration to the closed configuration. When the cam 60 is rotated in the opposite direction, the cam lobe 61 is brought out of contact with the camming surface 40, and the locking mechanism 20 may pivot into the open configuration (see FIGS. 13, 15, and 17). Accordingly, rotation of the knob 59 conveniently adjusts the locking mechanism 20 between the open and closed configurations and provides an efficient means of releasably securing the table portion 104 in any allowable orientation relative to the base portion 102.

Figure 30:
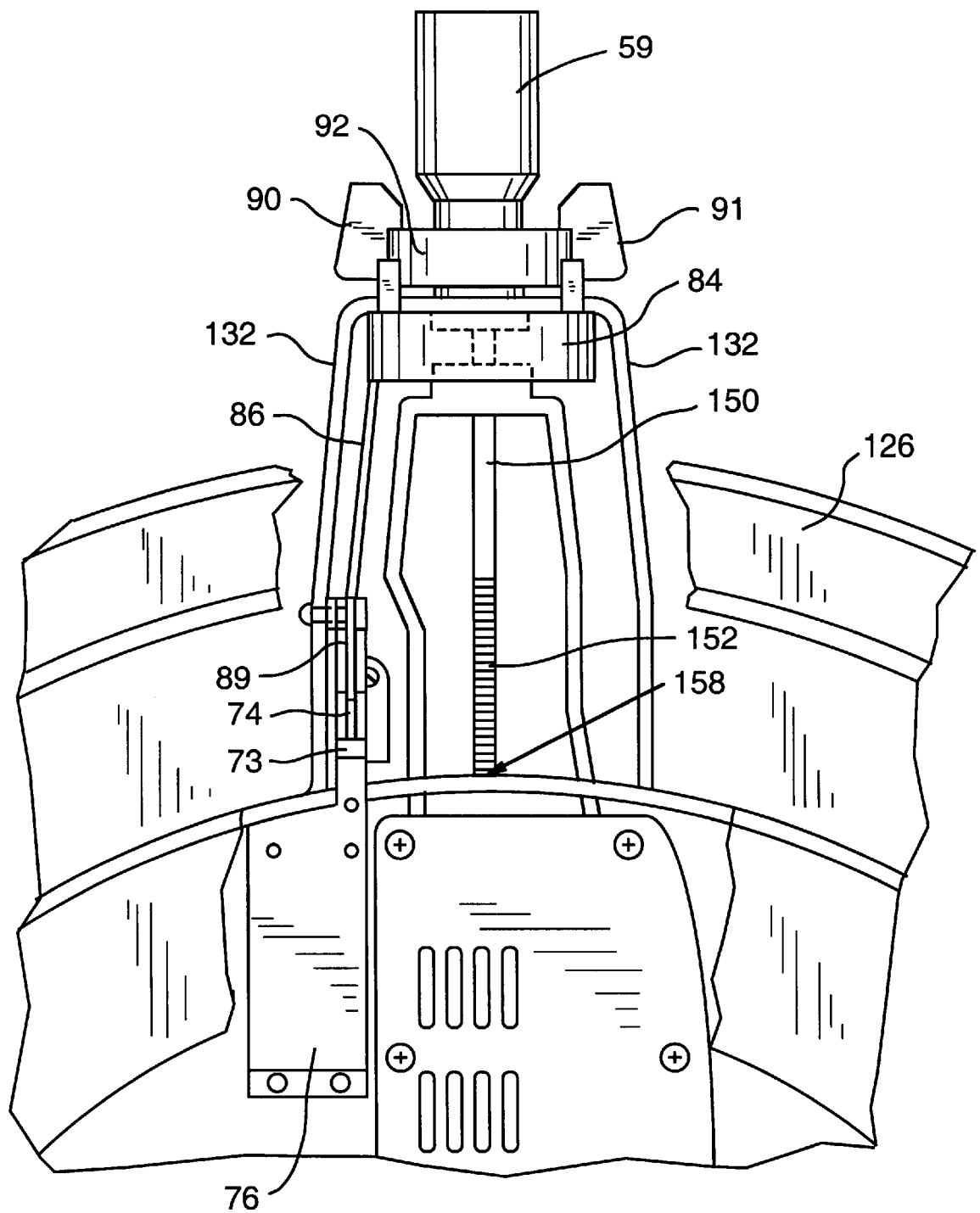
FIG. 30 is a partial cross-sectional view of a portion of a miter saw showing certain elements of another embodiment of the locking mechanism of the present invention.
Figure 31:
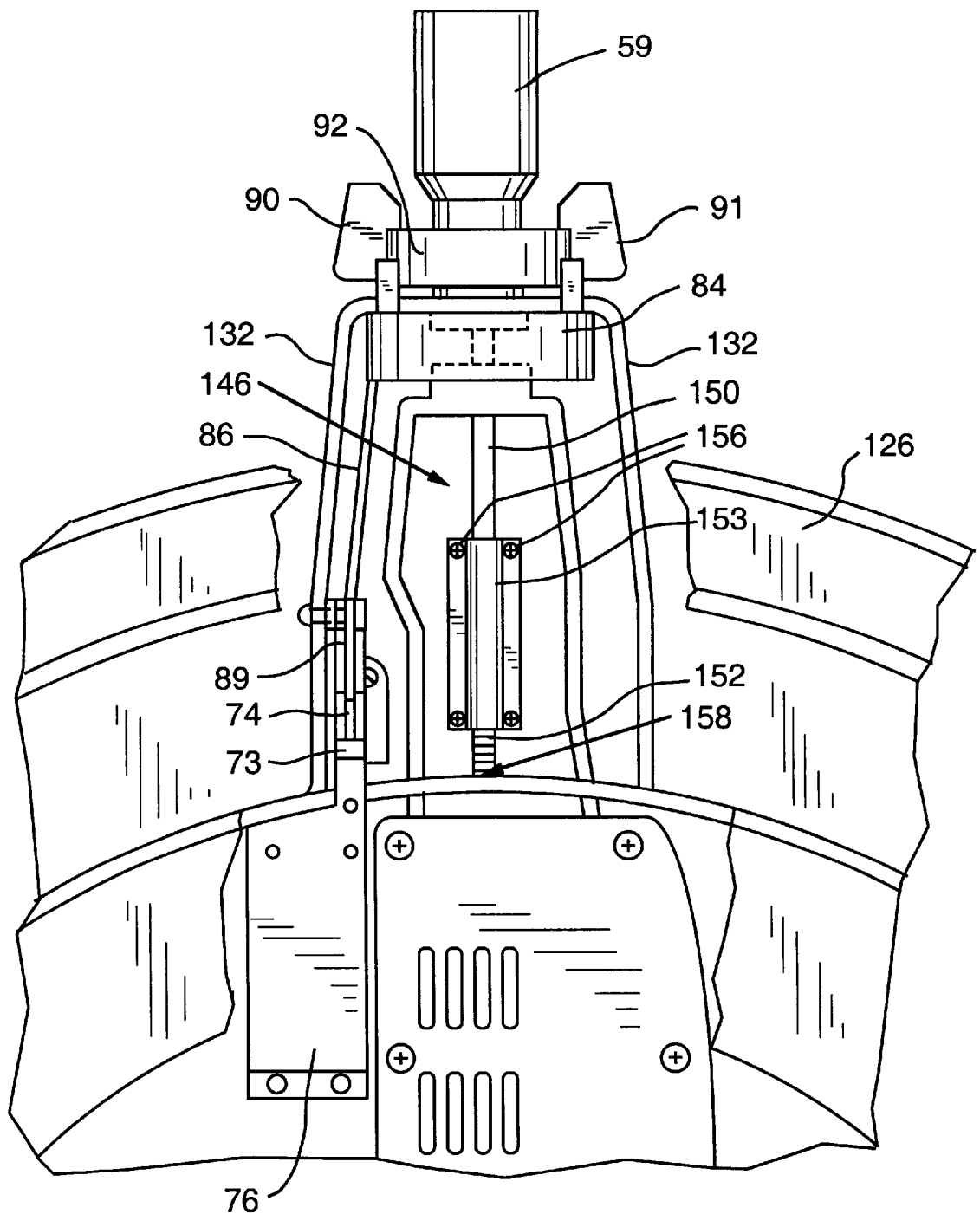
FIG. 31 is a partial cross-sectional view of a portion of the miter saw of FIG. 30, and illustrating certain elements of the locking mechanism removed from view.

It will be appreciated that other configurations of the locking mechanism 20 are within the scope of the present invention. In one such configuration depicted in FIGS. 30 and 31, which also show elements of an indexing mechanism described below, the locking mechanism 146 includes an elongate rod 150 having a threaded portion 152 at one end thereof and knob 59, manipulable by an operator, fixedly mounted at the other end thereof. The threaded end 152 of the rod 150 is positioned adjacent a contact surface 158 on the base portion 102. As shown in particular in FIG. 31, a housing 153 is provided on the underside of the extension 132 of the table portion 104 to secure the rod 150 to the table portion 104. The housing 153 is fixedly mounted to the extension 132 by way of screws 156. However, it will be appreciated that alternate means of mounting, such as, for example, welding and riveting, are also possible under the present invention. The housing 153 defines a path through which the rod 150 passes. The inner surface (not shown) of the housing 153 is provided with a series of threads (not shown) that correspond to the threads on the threaded portion 152 of the rod 150. Accordingly, rotation of the knob 59 causes the rod 150 to move along the threads of the inner surface of the housing 153 between an open position, in which the threaded end 152 of the rod 150 is not in contact with the contact surface 158, and a closed position, in which the threaded end 152 of the rod 150 is in contact with the contact surface 158. The simple rotation of the knob 59 thus provides an efficient means of releasably securing the table portion 104 in any allowable rotational orientation relative to the base portion 102.

Figure 32:
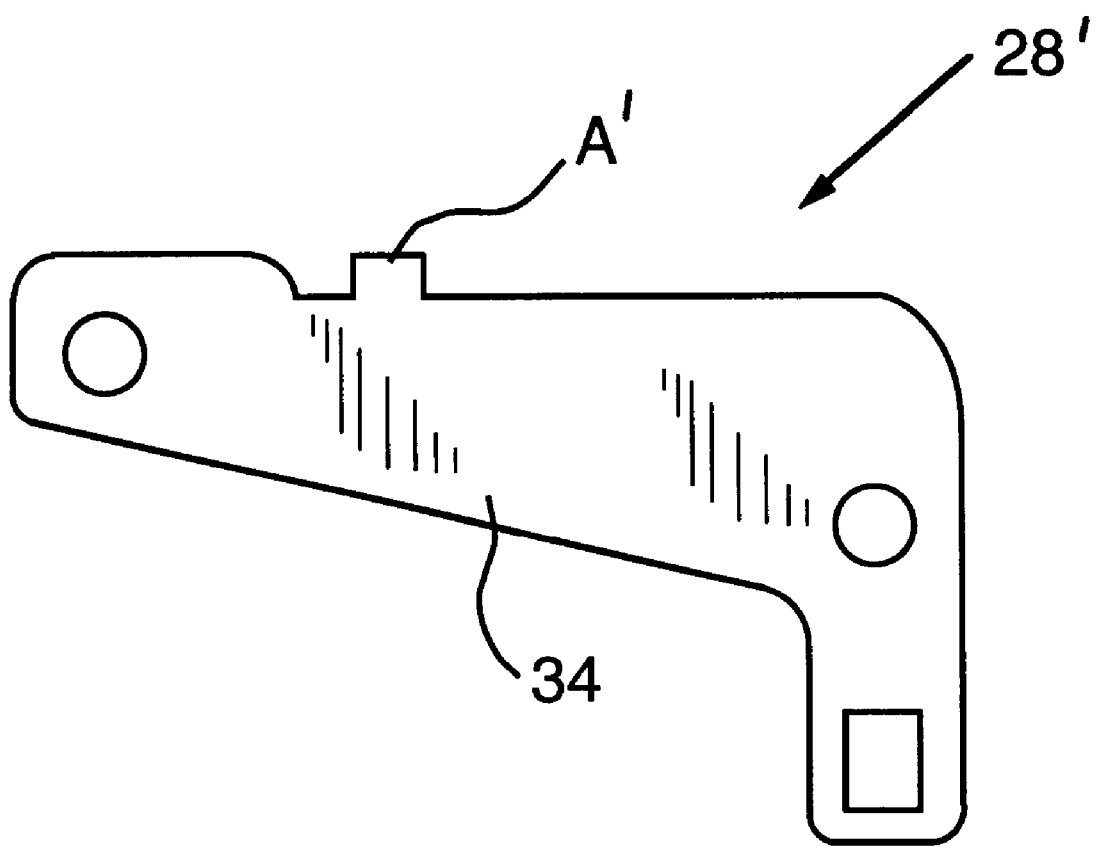
FIG. 32 is a depiction of a lock bar strap of an alternate embodiment of a locking mechanism of the present invention.
Figure 33:
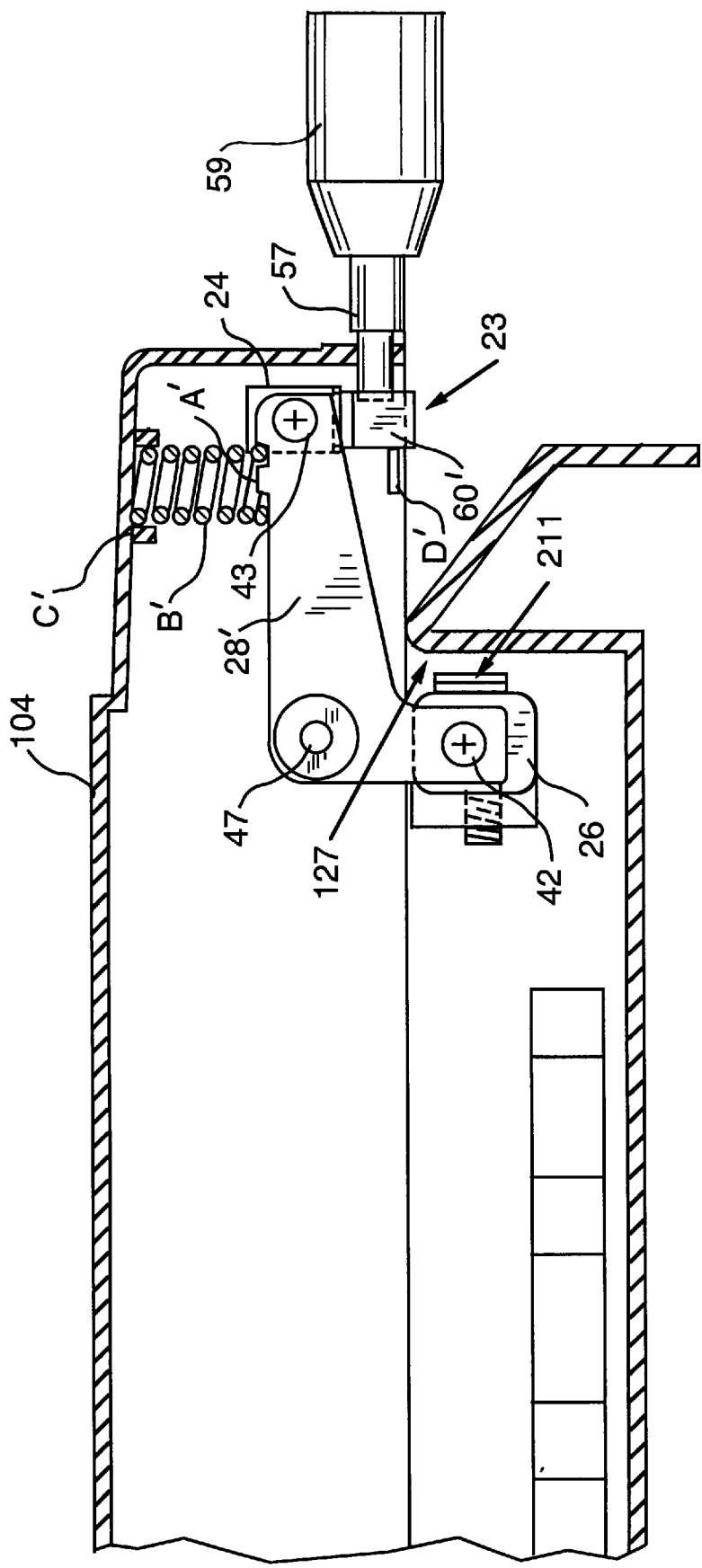
FIG. 33 is a cross-sectional view illustrating certain elements of an alternate embodiment of a locking mechanism of the present invention, and showing the elements disposed in an open configuration.
Figure 34:
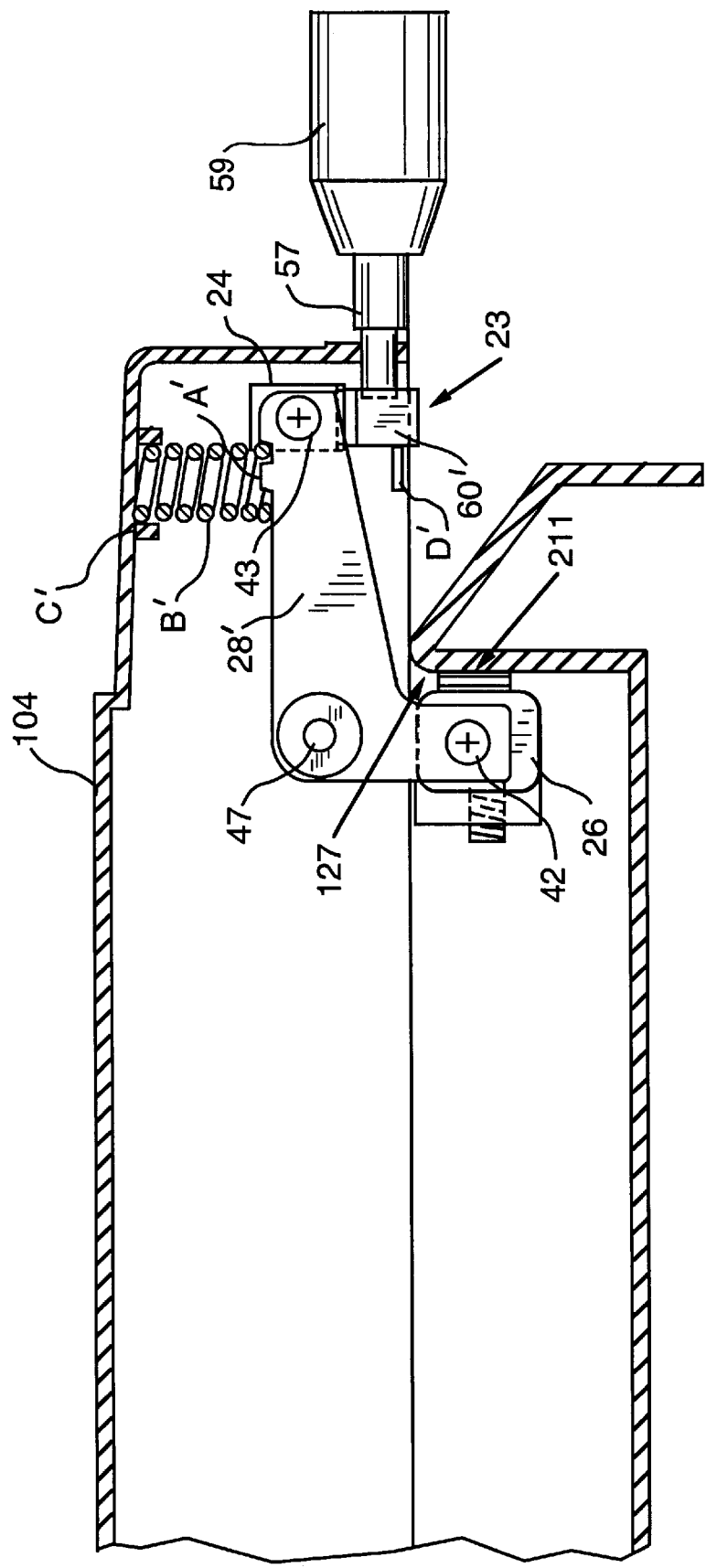
FIG. 34 is a cross-sectional view illustrating certain elements of the alternate locking mechanism embodiment shown in FIG. 33, and with the elements disposed in a closed configuration.

Elements of an additional alternate embodiment of locking mechanism 20 are shown in FIGS. 32 through 37. FIG. 32 shows locking strap 28', which differs in shape from locking straps 28 and 30 by including projection A' adjacent the end of locking strap 28' that is to be connected to cam bar 24. As shown in FIGS. 33 and 34, locking strap 28' is mounted within table portion 104 with a coil spring placed in compression between projection A' and a cylindrical projection C' extending from an inner surface of the table portion 104. The sectional view of FIGS. 33 and 34 is taken through a mid-section of both the coil spring B' and the cylindrical projection C'. It will be understood that the coil spring B' biases serrated face 211 away from the arcuate edge 127 of the table portion 104. Thus, coil spring B' performs a function corresponding to spring 101 of the embodiment shown in, for example, FIGS. 15 and 16. Manipulation of knob 59 urges serrated face 211 against arcuate edge 127, a condition shown in FIG. 34, causing the slight compression of coil spring B' as projection A' pivots upward toward cylindrical projection C'.

Figure 35:
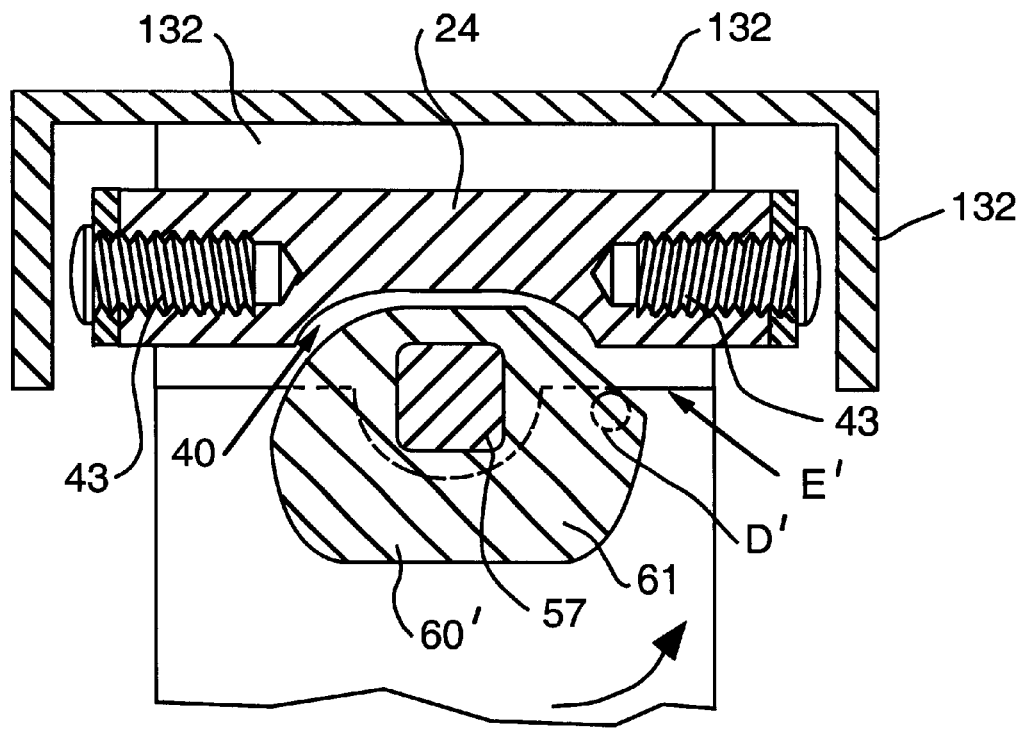
FIGS. 35 and 36 are partial cross-sectional views of a portion of a miter saw of the invention illustrating certain elements of the alternate locking mechanism shown in FIG. 33, and with the elements disposed in an open configuration and a closed configuration, respectively.
Figure 36:
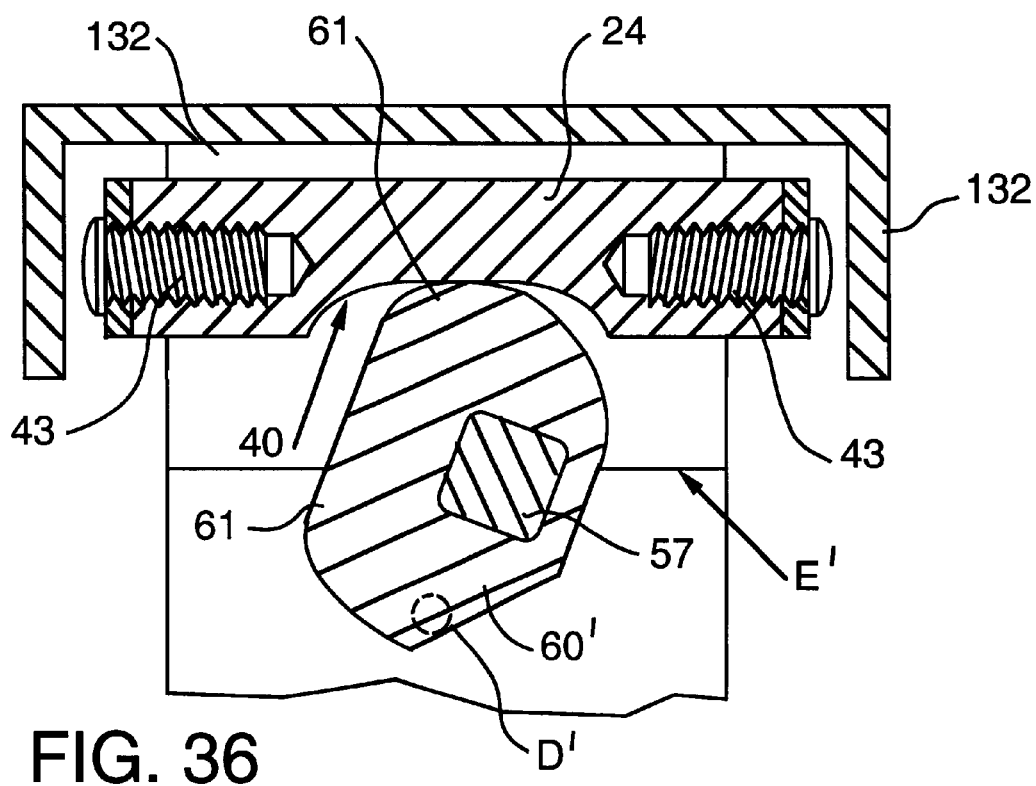
Figure 37:
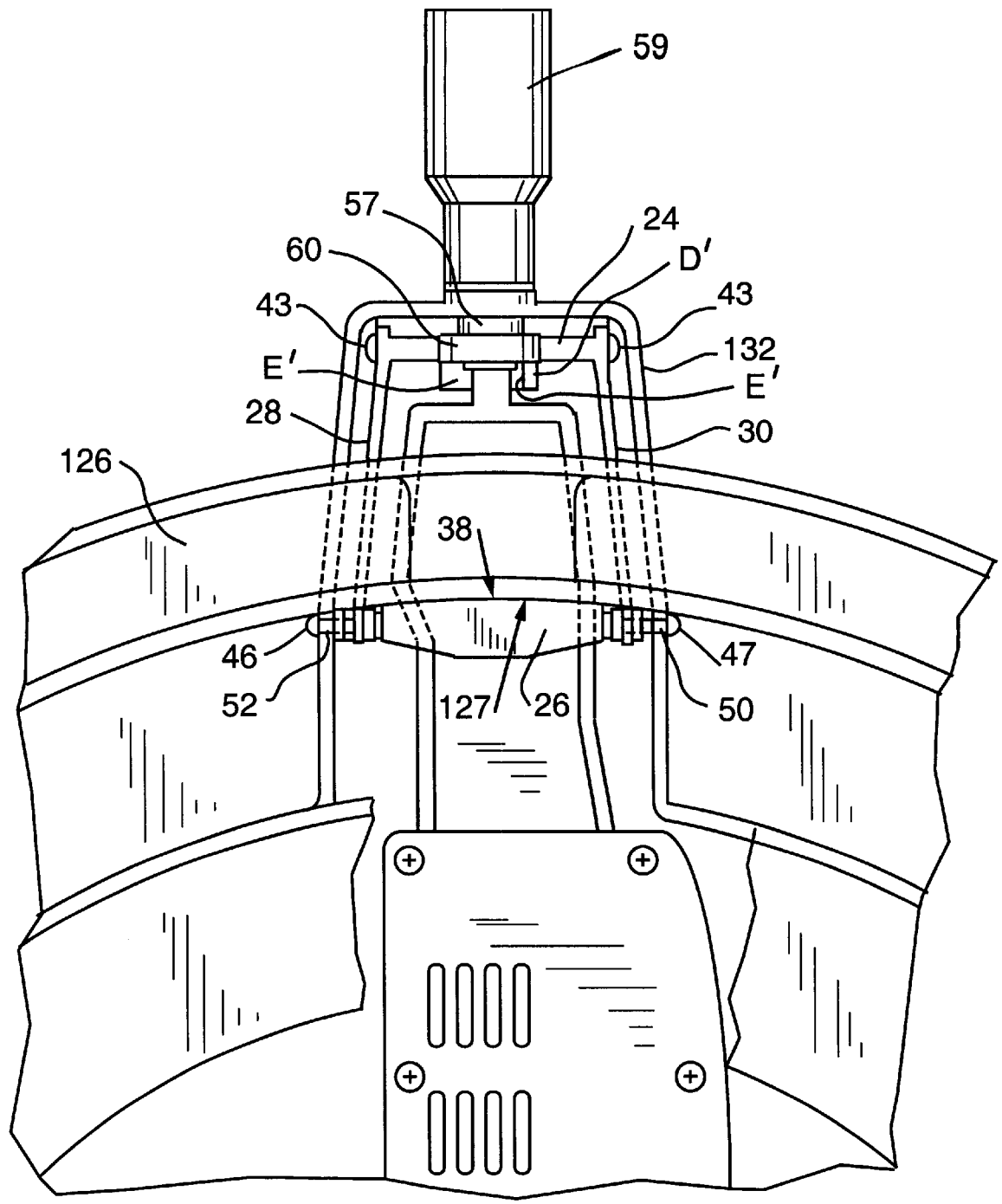
FIG. 37 is a bottom view of a portion of a miter saw of the invention, particularly showing certain elements of the alternate locking mechanism shown in FIG. 33, and with the elements in a closed configuration.

As further shown in FIGS. 34 and 35, the embodiment of locking mechanism 20 shown in FIGS. 32 through 37 also differs from the embodiments previously described in that it includes a cam 60' having a pin D' extending outward therefrom. FIGS. 35 and 36 illustrate the open and closed and closed configurations, respectively, of the locking mechanism. The position of pin D', which extends into the page in FIGS. 35 and 36, is shown in those figures in dotted lines. The pin D' is shown to be mounted offset from the axis of rotation of the cam 60' such that pin D' sweeps through an arc as cam 60' rotates. A surface E' (not shown in FIGS. 33 and 34) is provided and limits further rotation of cam 60' in the direction of the arrow in FIG. 35. This prevents inadvertent contact between the cam 60' and the camming surface 40 as the indexing mechanism is re-oriented from the closed configuration to the open configuration. Such inadvertent contact could bias serrated surface 211 into contact with arcuate surface 127 and unintentionally inhibit rotation of the table portion 104 relative to the base portion 102 as an operator rotates knob 59 to unlock the work table 104. FIG. 37 provides an additional view of the pin D' and the surface E' when the indexing mechanism 64 is in the position shown in FIG. 35, with pin D' in contact with surface E'.

As noted above, the adjustment mechanism 10 of the present invention may include an indexing mechanism 64. The indexing mechanism 64 is mounted to the table portion 104 and rotates with the table portion 104 relative to the base portion 102. The indexing mechanism 64 is adapted to engage an indexing ring 68 mounted to the base portion 102 to releasably secure the table portion 104 at any one of a number of predetermined rotational positions relative to the base portion 102. In particular, the indexing mechanism 64 generally includes a detent body assembly 66 pivotably mounted to the table portion 104 and a detent lever 70 adapted to actuate the detent body assembly 66 between an open configuration (see FIG. 24), in which the table portion 104 may pivot relative to the base portion 102, and a closed configuration (see FIG. 25), in which the table portion 104 is held in a fixed position relative to the base portion 102. The indexing ring 68 generally includes a surface formed from a plate of material having a generally arcuate edge portion. The edge portion of the indexing ring 68 is provided with a plurality of indexing slots 69 therein. The surface of the indexing ring 68 generally has a diameter slightly less than that of the guide ring 126. The indexing ring 68 is mounted to the base portion 102 by the pivot pin 105 (see FIG. 8) such that the indexing ring 68 is oriented within the guide ring 126 and the perimeter of the table portion 104.

Figure 21:
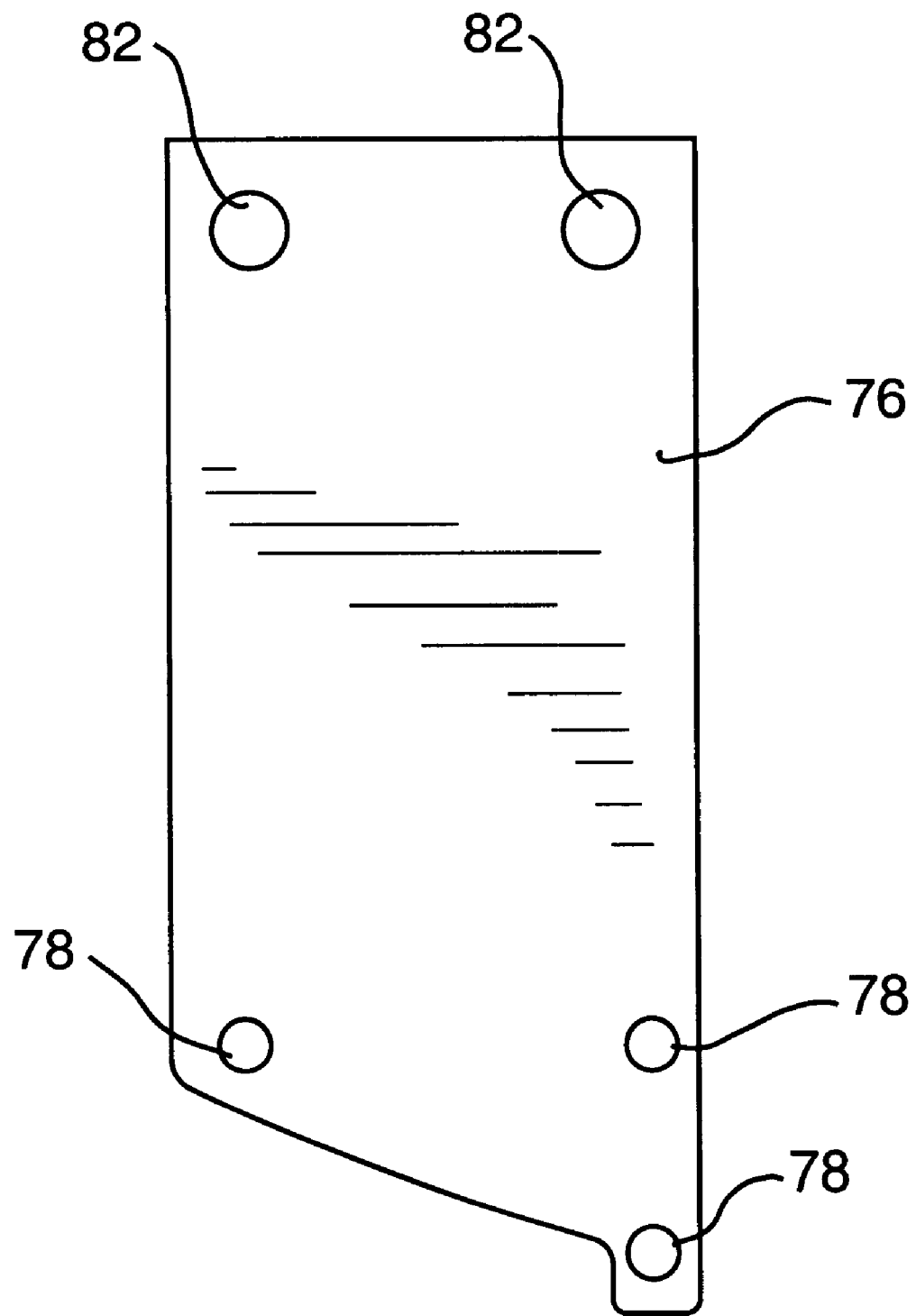
FIG. 21 is a depiction of the biasing member of the indexing mechanism of the embodiment of the adjustment mechanism shown in FIG. 19.
Figure 23:
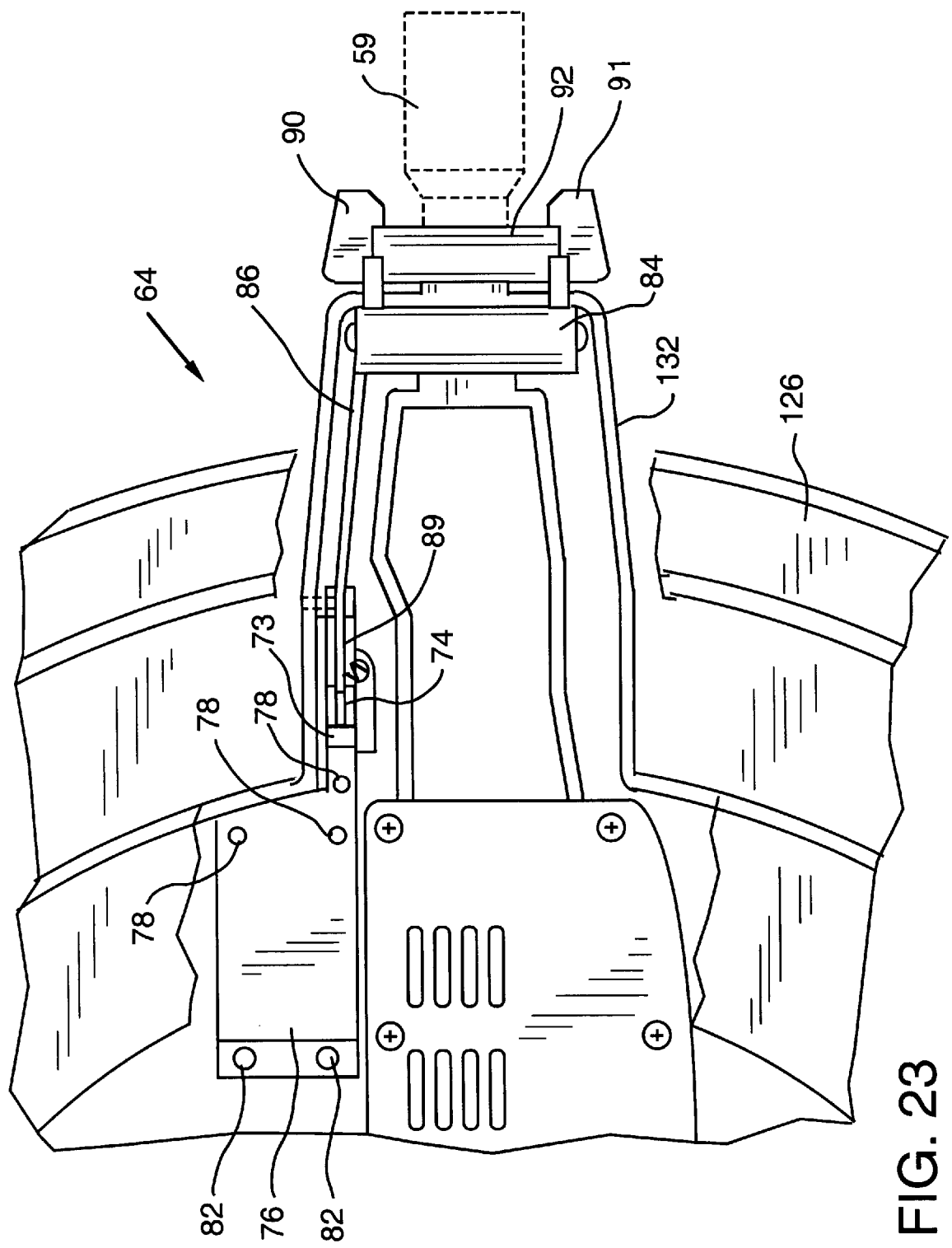
FIG. 23 is a bottom view of a portion of the miter saw of FIG. 19, particularly showing elements of the indexing mechanism of the embodiment of the adjustment mechanism shown in FIG. 19.

The detent body assembly 66 is pivotably mounted to the table portion 104 and generally includes a detent body 72 and a biasing member 76. The detent body 72 is pivotably mounted to the table portion 104 through the biasing member 76. As shown in FIGS. 20 (*a*)–(*c*), the detent body 72 is a rigid structure having an elongate arm 73 protruding therefrom. The arm 73 is provided with a detent pin 75 along the length thereof. The detent pin 75 is generally sized to fit within the indexing slots 69 in the indexing surface 68. The arm 73 is further provided with a slot 74 at the end thereof. The operation of the slot 74 will be described in greater detail below. The biasing member 76, shown in FIG. 21, may be formed from a length of spring steel. The biasing member 76 is fixedly mounted to the underside of the table portion 102. For example, threaded connectors 81 may be used to connect the biasing member 76 to the underside of the table portion 104 by way of bores 82 in the biasing member 76. The detent body 72 is fixedly mounted on the biasing member 76. For example, as indicated in FIGS. 20 and 21, the detent body 72 may be provided with several threaded bores 77 therein, and the biasing member 76 may be provided with several corresponding bores 78 therein. Threaded connectors 79 pass through aligned bores 76 and 78 and fixedly connect the detent body 72 to the biasing member 76. It will be understood, however, that equally effective alternate configurations for attaching the detent body 72 and biasing member 76 to the table portion 102, such as welding and riveting, are possible and will be apparent to those of ordinary skill.

The detent body 72 is oriented such that the detent pin 74 is aligned with the arcuate edge portion of the indexing ring 68. The biasing member 76 biases the detent pin 74 of the detent body 72 into contact with the arcuate edge portion of the indexing ring 68. Accordingly, as shown in particular in FIG. 25, when the table portion 102 is rotated relative to the base portion 104 such that the detent pin 74 is aligned with an indexing slot 69 of the indexing ring 68, the biasing member 76 urges the detent pin 74 into the aligned indexing slot 69. When the detent pin 74 is seated within an indexing slot 69, the table portion 104 will be held in a fixed orientation relative to the base portion 104. It will thus be appreciated that the table portion 104 may be secured at various predetermined rotational angles relative to the base portion 102 by selectively rotating the table portion seating the detent pin 74 within one of the several indexing slots 69.

The detent lever 70 contacts the detent body 72 to selectively control the seating of the detent pin 75 within the desired indexing slots 69. As shown in particular in FIG. 22, the detent lever 70 generally includes an elongate body having a handle 84 and a finger 86 at either end thereof. The finger 86 forms an elongate structure defining a tip 89 at one end thereof. The tip 89 is sized to fit within the slot 74 formed at the end of the arm 73 of the detent body 72. The handle 84 includes two ear portions 90 and 91 connected by a bridge portion 92. The bridge portion 92 defines an arcuate region 93 sized to correspond with the outer surface of the knob 59. Accordingly, as shown by the ghost image of the knob 59 in FIGS. 23–25, the handle 84 may be positioned adjacent to and below the knob 59, thus minimizing the overall space occupied by the adjustment mechanism 10.

Figure 24:
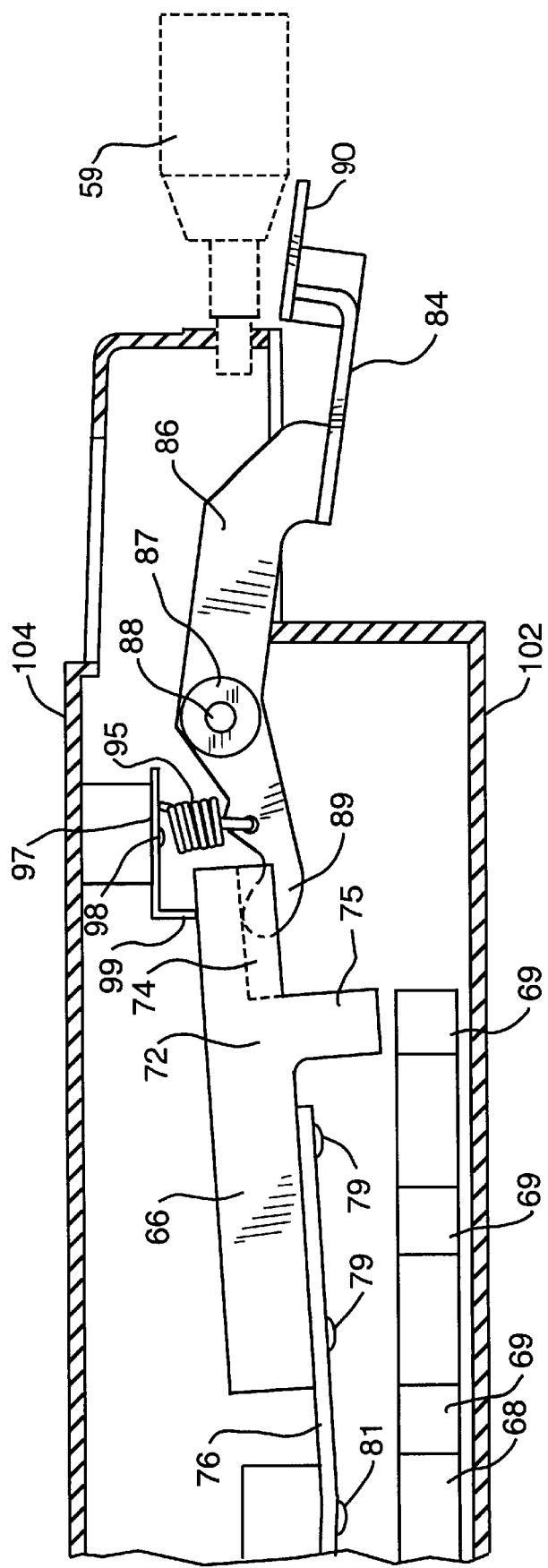
FIG. 24 is a partial cross-sectional view of a portion of the miter saw of FIG. 19, taken along the line C—C shown in FIG. 19, and illustrating certain elements of the indexing mechanism of the embodiment of the adjustment mechanism of FIG. 19 in an unindexed position.
Figure 25:
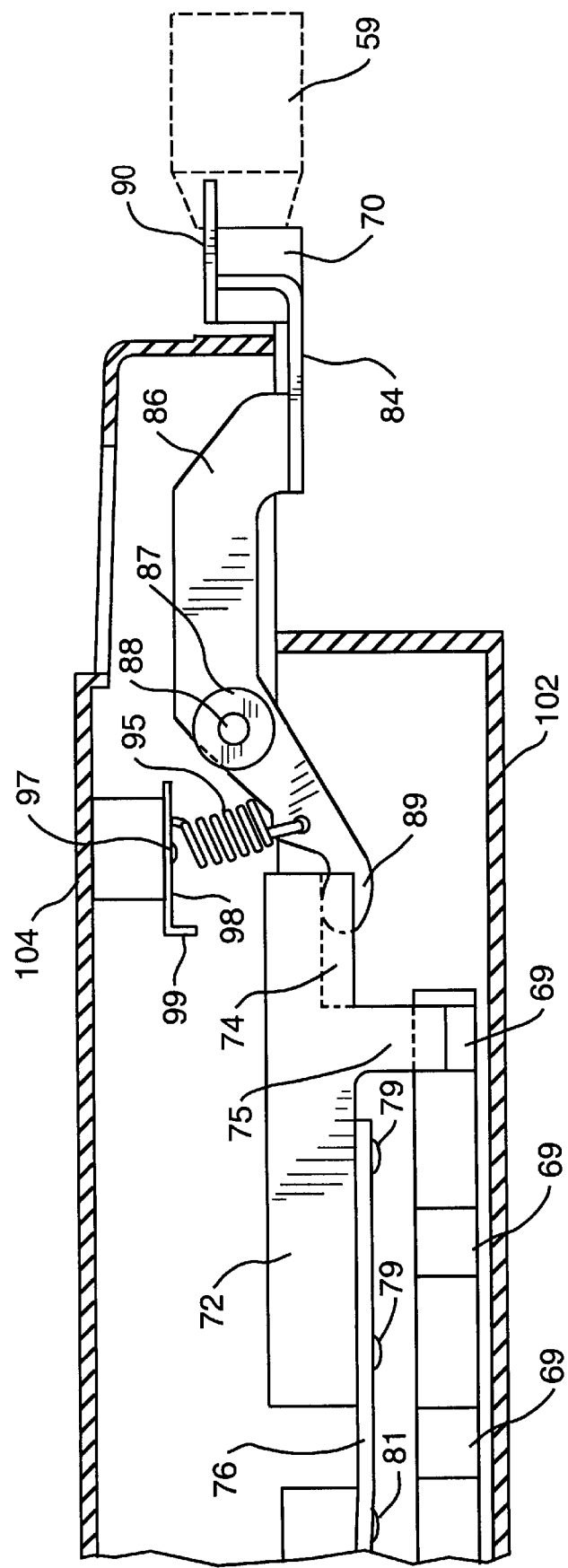
FIG. 25 is a partial cross-sectional view of a portion of the miter saw of FIG. 19, taken along the line C—C shown in FIG. 19, and showing certain elements of the indexing mechanism of the embodiment of the adjustment mechanism of FIG. 19 in a closed position.

The detent lever 70 is pivotably mounted to the table portion 104. In particular, the detent lever 70 is provided with a pivot bore 88 about which the detent lever 70 is pivotably mounted to the table portion 104. The pivot bore 88 corresponds in size to the pivot pin 47 about which the locking mechanism 20 is pivotably journaled, and the detent lever 70 is itself pivotably journaled about the pivot pin 47 on the pivot bore 88. As shown in FIGS. 24 and 25, the detent lever 70 is positioned such that the tip 89 is seated within the slot 74. Pivoting of the detent lever 70 about the pivot pin 47 thus causes the tip 89 to operably interact with the detent pin 75 and urge the indexing mechanism 64 between the open (FIG. 24) and closed (FIG. 25) configurations. In particular, as shown in FIG. 24, when the handle 84 is depressed, the tip 89 of the finger 86 is pivoted upward and engages the slot 74 in the detent body 72. The upward force of the tip 89 against the slot 74 pivots the detent body 72 upward against the biasing force of the biasing member 76 and away from the indexing ring 68. As the detent body 72 pivots away from the surface of the indexing ring 68, the detent pin 75 pivots up and out of the indexing slot 69 in the indexing ring 68. When the detent pin 75 is out of the indexing slot 69, the indexing mechanism 64 is in the open configuration and the table portion 104 is free to rotate relative to the base portion 102. As shown in particular in FIG. 25, when the force on the handle 84 is released, the biasing force created by the biasing member 76 urges the detent body 72 into contact with the surface of the indexing ring 68. When the detent pin 75 corresponds with an indexing slot 69 in the indexing ring 68, the biasing force created by the biasing member 76 seats the detent pin 75 within the indexing slot 69. When the detent pin 75 is seated within the indexing slot 69, the indexing mechanism 64 is disposed in the closed configuration and the table portion 104 is held in position relative to the base portion 102. It will thus be appreciated that the indexing mechanism 64 is adapted to releasably secure the table portion 104 relative to the base portion 102 in a number of predetermined positions defined by the positions of the indexing slots 69 within the indexing ring 68.

As shown in FIGS. 24 and 25, the indexing mechanism 64 further includes guide spring 95 attached between a guide plate 97 and the detent lever 70. In particular, the guide plate 97 includes an "L" shaped rigid member defining a base 98 and a tab 99. The base 98 is fixedly anchored to the table portion 104 and serves as an anchor for one end of the guide spring 95. The guide spring 95 may be a coil spring attached at one end to the base 98 and at the other end to the detent lever 70. Accordingly, the guide spring 95 aides in maintaining the position of the tip 89 of the finger 86 within the slot 74 during operation of the indexing mechanism 64. The tab 99 is positioned such that the detent body 72 will impact against the tab 99 when the detent pin 75 has been fully removed from the indexing slot 69 and the indexing mechanism 64 is in the open configuration. The impact of the detent body 72 against the tab 99 thus provides a cue to the operator of the adjustment mechanism 10 that the indexing mechanism 64 is in the open configuration and the table portion 104 is free to rotate relative to the base portion 102.

Figure 26:
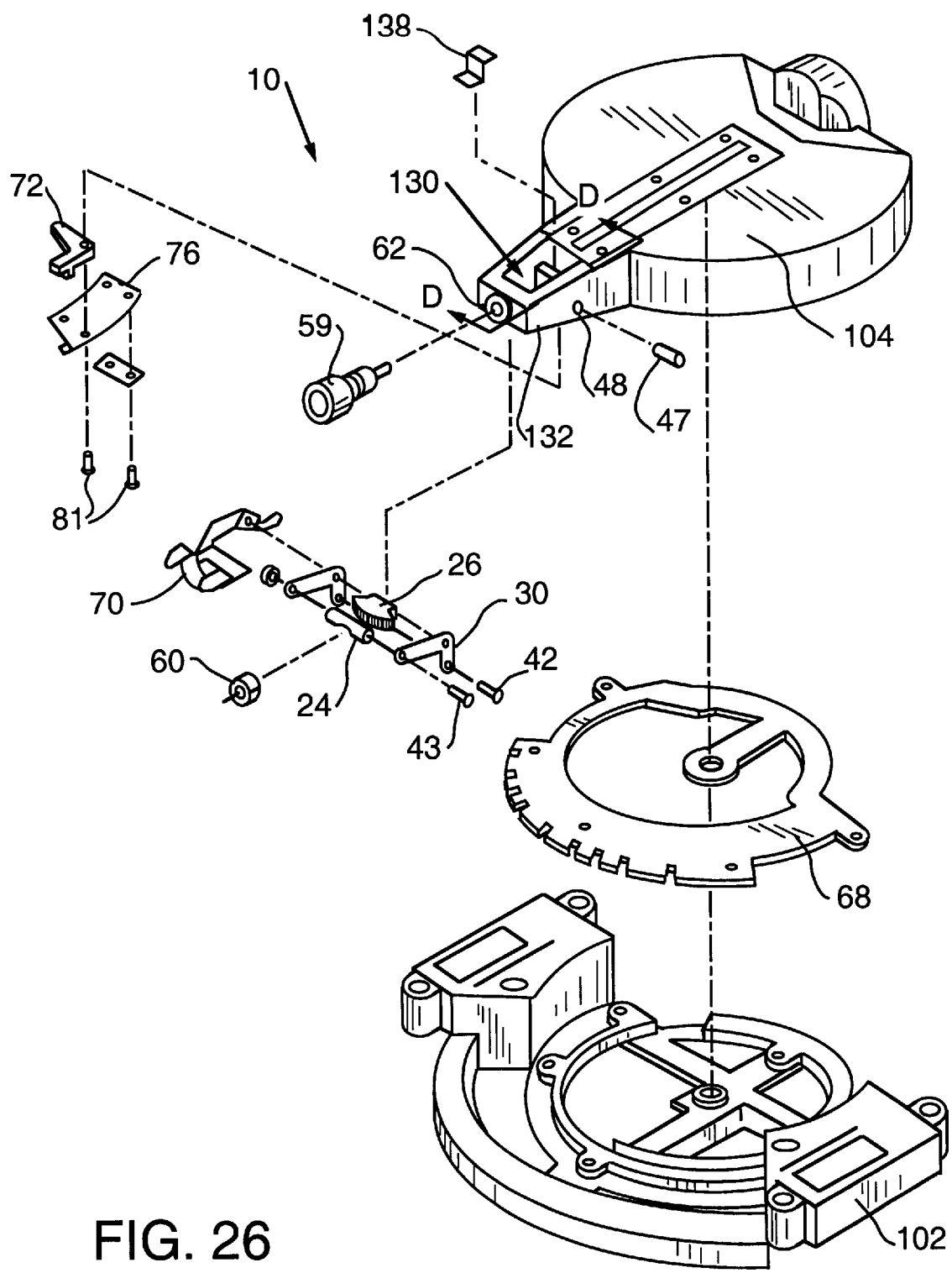
FIG. 26 is an assembly view of certain elements of the miter saw of FIG. 1, particularly showing certain elements of the locking and indexing mechanisms of the embodiment of the adjustment mechanism of FIG. 1.
Figure 27:
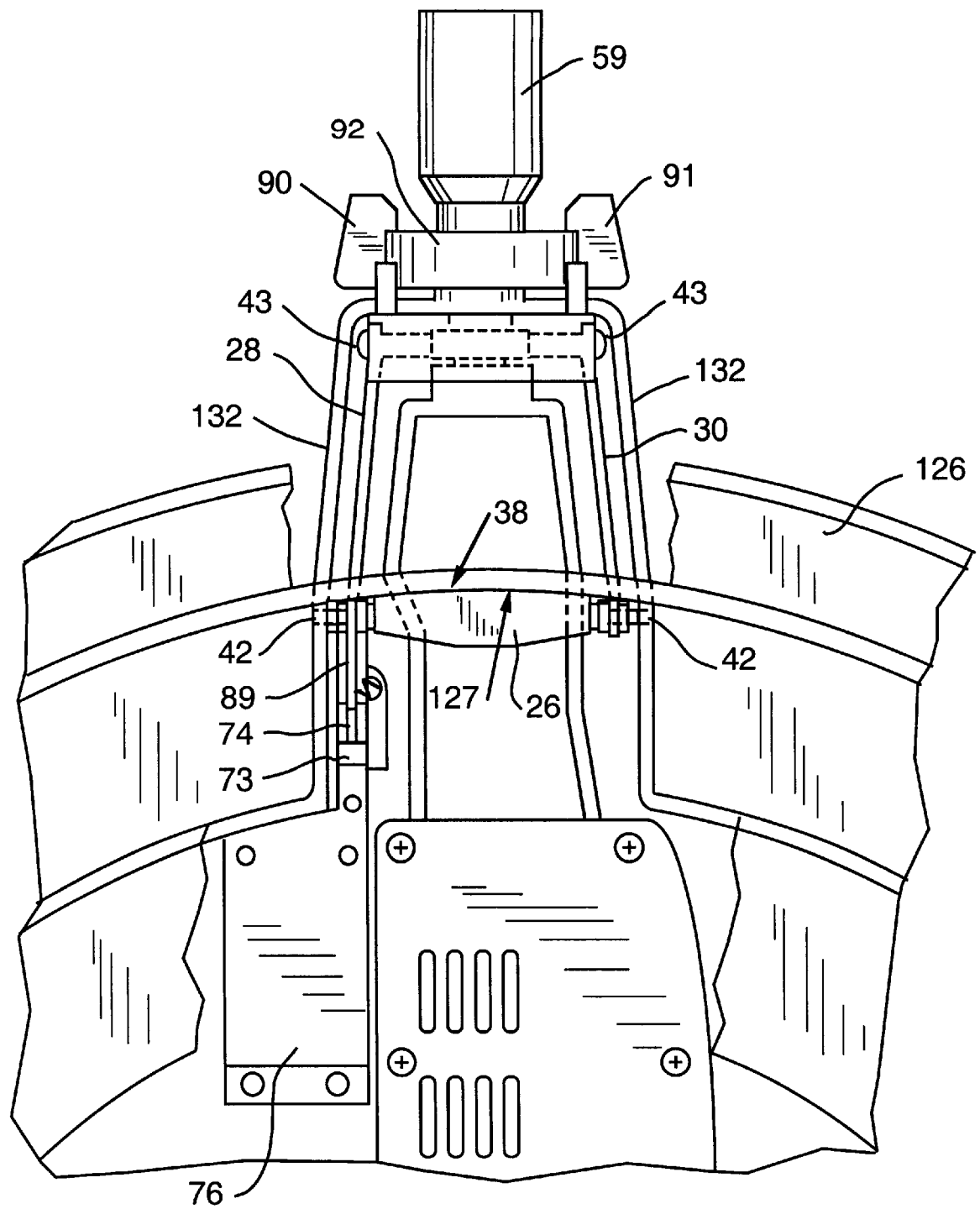
FIG. 27 is a bottom view of a portion of the miter saw of FIG. 26, particularly showing certain elements of the locking and indexing mechanisms of the embodiment of the adjustment mechanism of FIG. 26 in a closed position.
Figure 28:
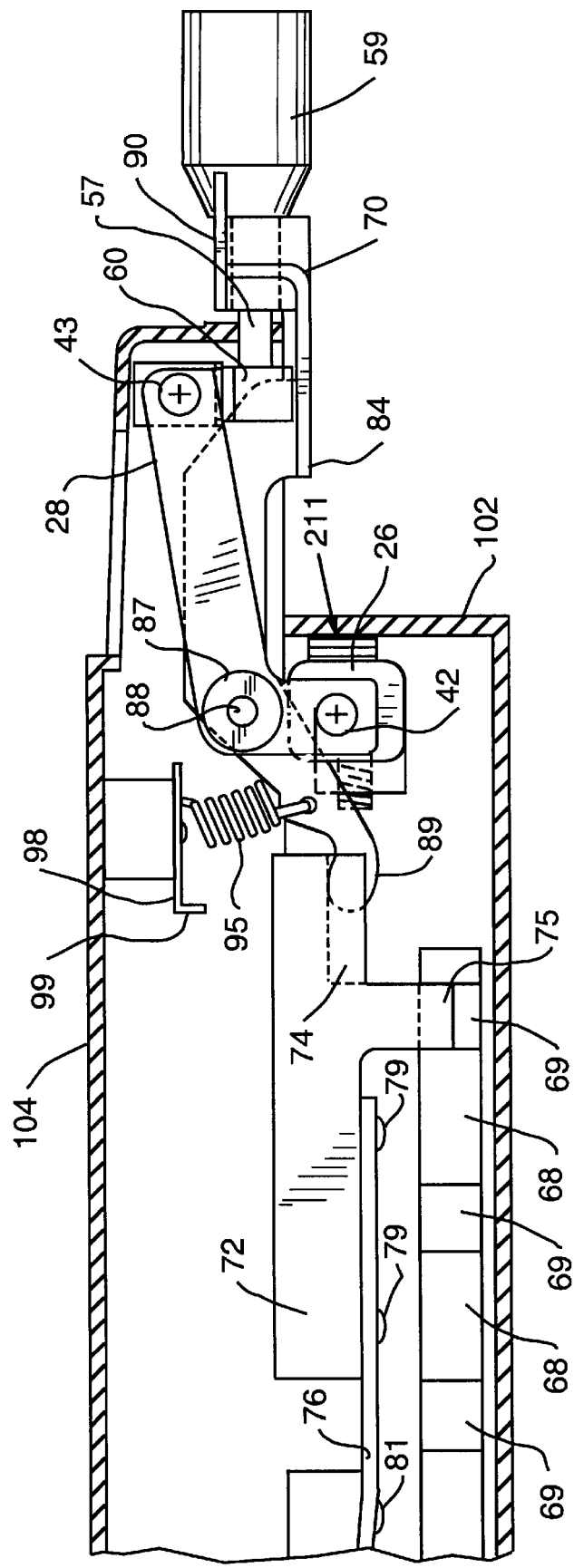
FIG. 28 is a partial cross-sectional view of a portion of the miter saw of FIG. 26, taken along the line D—D shown in FIG. 26, showing certain elements of the locking and indexing mechanisms of the embodiment of the adjustment mechanism of FIG. 26 in a closed position.

As can be appreciated from the above description, the adjustment mechanism 10 of the present invention provides the ability to efficiently and effectively secure the table portion 104 of a miter saw 100 relative to the base portion 102 in a variety of positions, while providing distinct advantages over known designs. Accordingly, the adjustment mechanism 10 may include both an indexing mechanism 64, by which the table portion 104 may be secured in a variety of predetermined rotational positions relative to the base portion 102, and a locking mechanism 20, by which the table portion 104 may be secured in one of a vast number of operator-defined positions relative to the base portion 102. The adjustment mechanism 10 of the present invention provides the ability to quickly and efficiently secure the table portion 104 in place relative to the base portion 102 using both the locking mechanism 20 and the indexing mechanism 64 in conjunction with one another. That arrangement is shown in FIGS. 26 through 28, and each of the elements in those figures has been described above. It will be appreciated that an operator may conveniently use a single hand to manipulate the knob 59 and the detent lever 70 to thereby adjust and then lock the position of the work table 104 relative to the base position 102.

Figure 38:
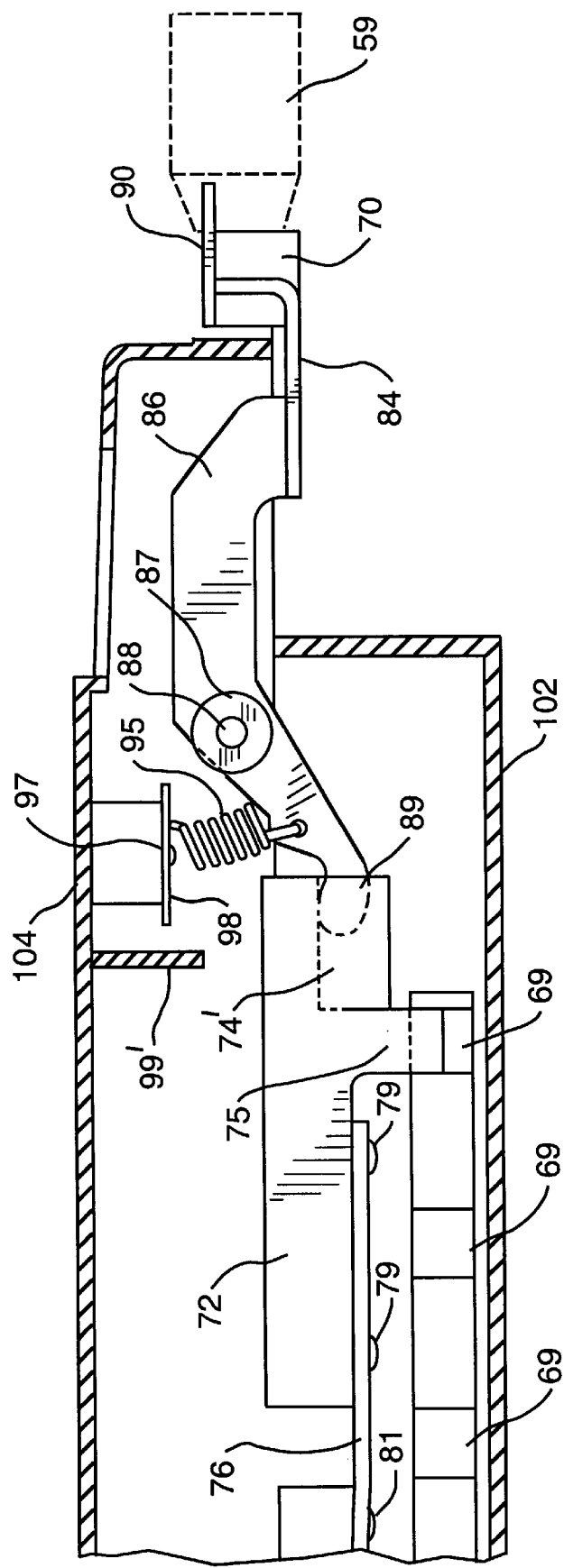
FIG. 38 is a cross-sectional view of a portion of a miter saw of the present invention illustrating certain elements of an alternate embodiment of an indexing mechanism of the present invention, and showing the elements disposed in a closed configuration.

An alternate embodiment of the indexing mechanism 64 is shown in FIG. 38, which depicts a closed configuration of the mechanism. The indexing mechanism of FIG. 38 differs from that described above and shown in, for example, FIG. 25, by including a slot 74' that is deeper than slot 74 to better ensure that tip 89 remains seated within slot 74'. Rather than including a tab 99 on guide plate 97, the embodiment of FIG. 38 includes a projection 99' that is a part of and projects from an inner surface of work table 104. The projection 99' limits the travel of detent body 72 in a fashion similar to tab 99.

Figure 39:
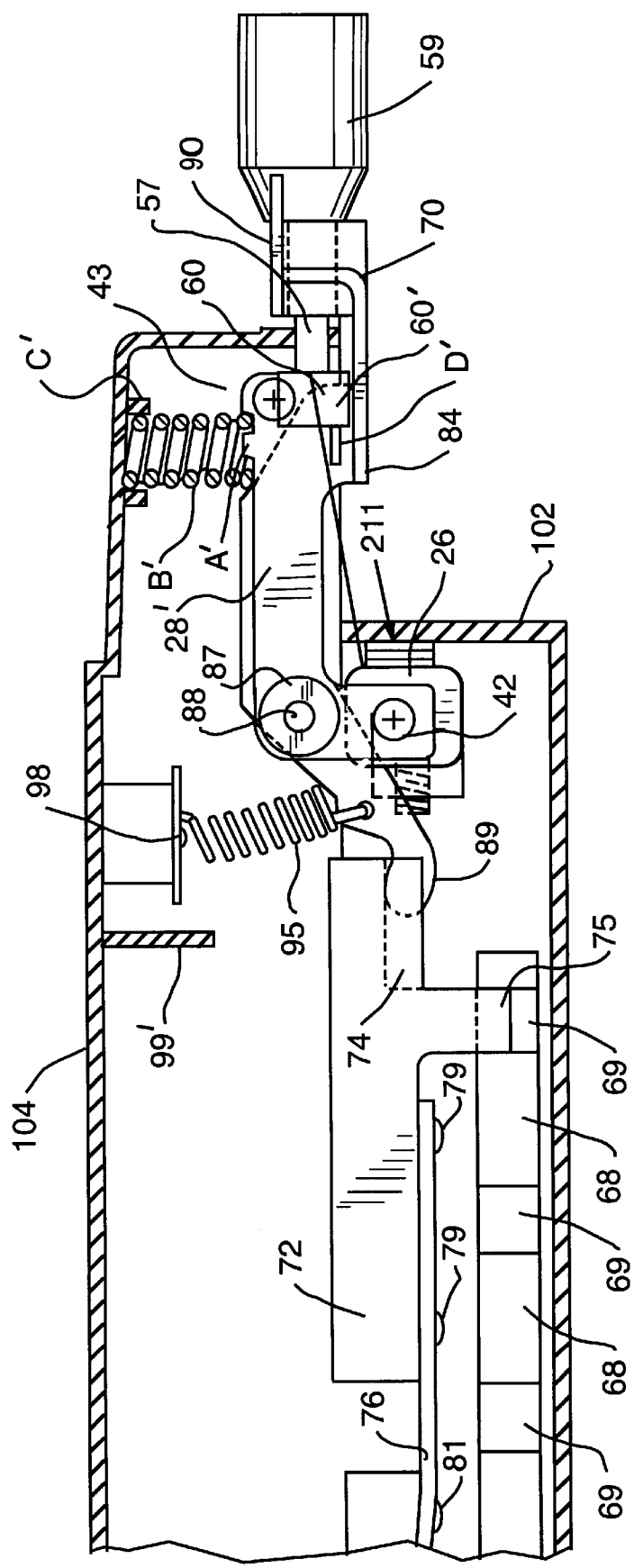
FIGS. 39 and 40 are cross-sectional and assembly views, respectively, of a miter saw of the present invention incorporating embodiments of a locking mechanism and an indexing mechanism according to the present invention.
Figure 40:
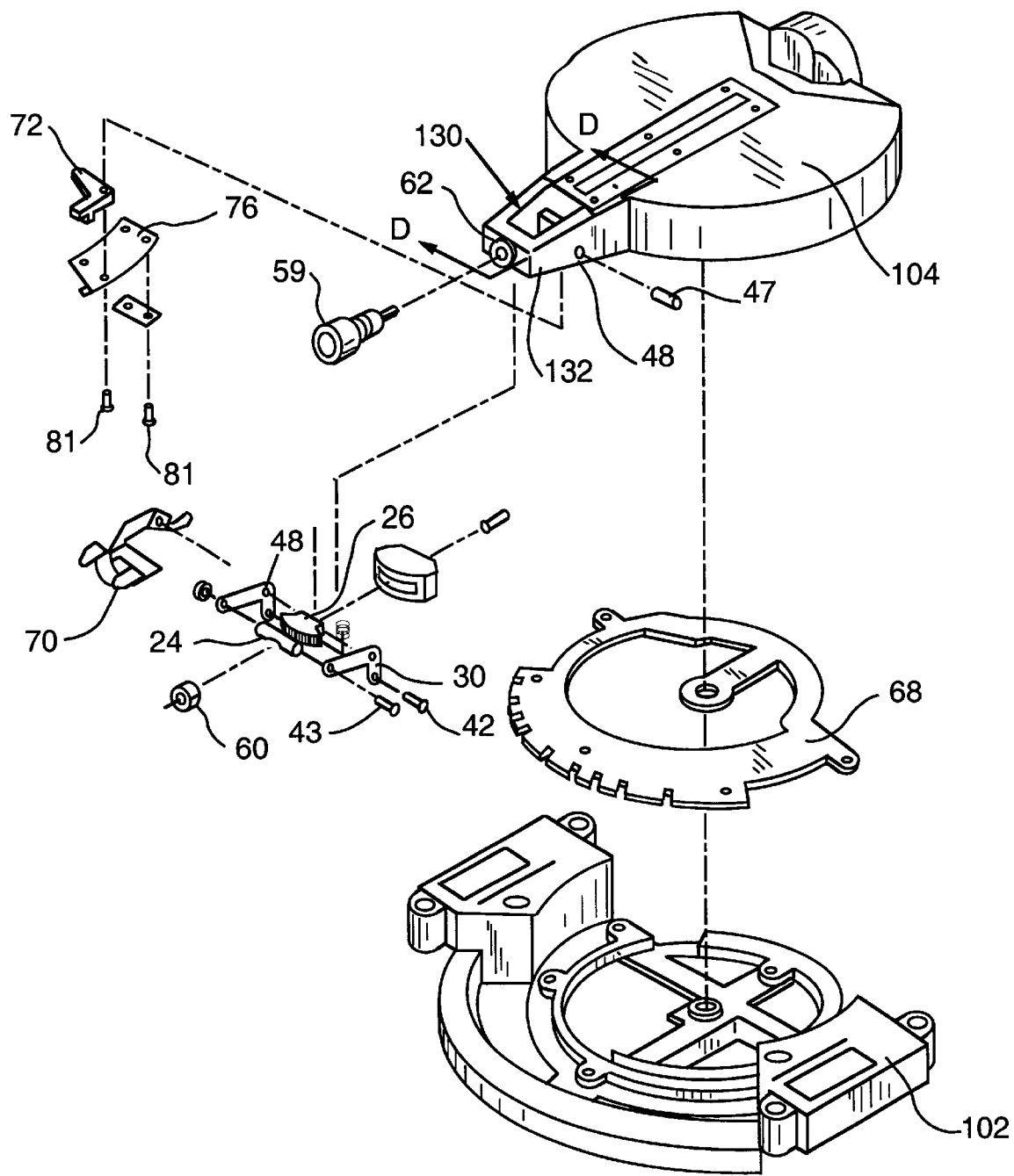

FIGS. 39 and 40 are views of a miter saw including a locking mechanism as generally shown in FIGS. 32 through 37 and described above, and an indexing mechanism as generally shown in FIG. 38 and described above. Thus, the embodiment of FIGS. 39 and 40 includes elements 60', 74', and A' through D' as described above, as well as E', an element that is not shown in FIGS. 39 and 40.

Those of ordinary skill in the art will appreciate that various changes in the details, materials, and arrangement of parts which have been herein described and illustrated in order to explain the nature of the invention may be made by the skilled artisan and that such changes remain within the principle and scope of the invention as expressed in the appended claims.

What is claimed is:

1. A woodworking machine comprising:
   a driven cutting member that is movably attached to a first portion, the first portion having a first surface;
   a second portion having a second surface, said first surface rotatable relative to said second surface;

a locking mechanism selectively restraining rotation of said first surface relative to said second surface, the locking mechanism comprising:
  a locking frame pivotably mounted on said first portion and including a locking surface, said locking surface selectively frictionally engaging an engagement surface on said second portion, said locking frame further including a camming surface; and
  an actuating mechanism selectively frictionally engaging said locking surface and said engagement surface, the actuating mechanism comprising:
    a cam having a cam lobe, said cam pivotably connected relative to said camming surface, said cam lobe selectively engaging said camming surface to move said locking surface to frictionally engage said engagement surface; and
    a knob fixedly connected to said cam, movement of said knob pivoting said cam relative to said camming surface; and
an indexing mechanism selectively restraining rotation of said first surface relative to said second surface in a plurality of predetermined positions.

2. The apparatus of claim 1, wherein said actuating mechanism further comprises an axle having a first and second end, said cam fixedly mounted on said first end and said knob fixedly mounted on said second end.

3. The apparatus of claim 2, wherein said locking surface is defined by a locking bar and said camming surface is defined by a cam bar, and further wherein said locking frame supports said locking bar in fixed relation to said cam bar.

4. The apparatus of claim 3, wherein said locking frame supports said locking surface in pivotal contact with said engagement surface and said cam lobe selectively pivotably engages said cam bar.

5. The apparatus of claim 1, wherein said engagement surface further comprises an arcuate surface having a diameter and said locking surface further comprises an arcuate surface having a diameter corresponding to said diameter of said engagement surface.

6. The apparatus of claim 1, wherein said apparatus is a miter saw, the driven cutting member is a saw unit, the first portion is a table portion, and the second portion is a base portion.

7. An adjustment mechanism for pivotably adjusting the workpiece support surface of a woodworking machine, wherein the workpiece support surface includes a first surface and a second surface, said first surface defined by a table portion, said table portion rotatable relative to a base portion defining said second surface, the adjustment mechanism comprising:
  a locking mechanism including a locking bar having a locking surface, said locking mechanism selectively restraining rotation of said table portion relative to said base portion, the locking mechanism further comprising:
    a locking frame pivotably mounted on said table portion and including a locking surface, said locking surface selectively frictionally engaging an engagement surface on said base portion, said locking frame further including a cam bar, said cam bar including a camming surface; and
    an actuating mechanism selectively frictionally engaging said locking surface with said engagement surface, the actuating mechanism comprising:
      a cam having a cam lobe, said cam pivotably connected relative to said camming surface, said cam lobe selectively engaging said camming surface to move said locking surface to frictionally engage said engagement surface; and
      a knob fixedly connected to said cam, movement of said knob pivoting said cam relative to said camming surface; and
  an indexing mechanism selectively restraining rotation of said table portion relative to said base portion in a plurality of predetermined positions.

8. The apparatus of claim 7, wherein said actuating mechanism further comprises an axle having a first and second end, said cam fixedly mounted on said first end and said knob fixedly mounted on said second end.

9. The apparatus of claim 7, wherein said locking frame pivotably supports said locking surface in pivotal contact with said engagement surface and said cam lobe is adapted to pivotably engage said cam bar.

10. The apparatus of claim 7, wherein said engagement surface is an arcuate surface and said locking surface comprises an arcuate surface corresponding in diameter to said engagement surface.

* * * * *